United States Patent

Chui et al.

[11] Patent Number: 5,841,473
[45] Date of Patent: Nov. 24, 1998

[54] IMAGE SEQUENCE COMPRESSION AND DECOMPRESSION

[75] Inventors: Charles K. Chui, Brazos County; Jianrong Wang, Montgomery County, both of Tex.

[73] Assignee: Software for Image Compression, N.V., Curacao, Netherlands Antilles

[21] Appl. No.: 732,491

[22] PCT Filed: Jul. 26, 1996

[86] PCT No.: PCT/US96/12326

§ 371 Date: Oct. 31, 1996

§ 102(e) Date: Oct. 31, 1996

[87] PCT Pub. No.: WO97/06642

PCT Pub. Date: Feb. 20, 1997

[51] Int. Cl.$^6$ .............................. H04N 7/26; H04N 7/50
[52] U.S. Cl. .................... 348/390; 348/398; 348/424; 348/421
[58] Field of Search ................................. 348/390, 403, 348/421, 424, 425, 397, 398; 382/232, 248; H04N 7/26, 7/50

[56] References Cited

U.S. PATENT DOCUMENTS 5,604,824  2/1997  Chui ........................................ 382/248

OTHER PUBLICATIONS

Vandendorpe, "Hierarchical Transform and Subband Coding of Video Signals", *Signal Processing Image Communication*, vol. 4, No. 3 (Elsevier, 1992), pp. 245–262.

Tewfik et al., "Fast Positive Definite Linear Systen Solvers", *IEEE Trans. Signal Processing*, vol. 42, No. 3 (1994), pp. 572–584.

Tewfik, et al., "Fast Multiscale Statistical Processing Algorithm", 25$^{th}$ *Asilomar Converence on Signals Systems and Computers*, (IEEE,1991), pp. 773–777.

Comon, et al., "An Incomplete Factorization Algorithm for Adaptive Filtering", *Signal Processing*, vol. 13, No. 4 (1987), pp. 353–360.

Yuan, et al., "Order–Recursive FIR Smoothers", *IEEE Trans. Signal Processing*, vol. 42, No. 5 (1994), pp. 1242–1246.

*Primary Examiner*—Howard W. Britton
*Attorney, Agent, or Firm*—Anderson, Levine & Lintel

[57] ABSTRACT

A method and system for compressing and decompressing a sequence of image frames is disclosed. According to the disclosed embodiments of the invention, the compression process includes an intraframe decomposition process (24, 24') performed upon each frame in both the row and column directions, including an m$^{th}$ order averaging and differencing operation (56, 62). Each frame is then combined with others in an adjacent pair or group of four by way of an interframe decomposition (28). Quantization (30) is then performed, preferably by division of each coefficient by a quantizer (ρ) associated with the one of the frequency component subbands containing the coefficient. Reconstruction of the compressed frames is accomplished by performing the inverse of the compression process. According to the disclosed embodiments, either the compression or decompression processes and systems performs Cholesky filtering (60, 66; 170, 172), preferably in a recursive manner by way of forward and backward filtering. In this way, one or the other of the compression system (CS) or decompression system (DS) is relieved from a significant amount of computing burden.

16 Claims, 13 Drawing Sheets

IMAGE SEQUENCE COMPRESSION AND DECOMPRESSION

This invention is in the field of data compression, and is specifically directed to the compression of temporal or spatial sequences of images.

BACKGROUND OF THE INVENTION

The combination of modern data compression and decompression technology with the ever-increasing capability of desktop workstations and personal computers has enabled important changes in the transmission, storage, and use of information. These techniques have been applied to three-dimensional images, where the third dimension may correspond to time (e.g., a motion picture) or to space (e.g., a cross-sectional view of a complex three-dimensional object or volume). For example, the telecommunication and viewing of audio-visual images and sequences, such as over the Internet, is now commonplace. In addition, data compression techniques are widely used in the archiving and retrieval of data bases, including large three-dimensional graphics data bases such as useful in the seismic prospecting field.

One type of well-known data compression approach is referred to as lossless data compression, in which repetitive bits in the digital representation of information are combined. An example of lossless compression is commonly referred to as "byte packing". The defining characteristic of lossless compression is that an exact copy of the input information is obtained upon decompression. Because of this feature, lossless compression is useful in the storage and communication of computer programs, numerical databases, and other information in which exact replication is a requirement. However, the compression ratio achieved from modern lossless compression is relatively low. As a result, the application of only lossless compression to massive data representations, such as motion pictures and seismic surveys, is inadequate to allow real-time communication of the sequences, or significant storage savings.

Lossy data compression techniques are also known in the art. The defining characteristic of lossy data compression is, of course, that the decompressed information cannot exactly match that of the original information; in other words, some information is lost in the compression of the input information. Lossy compression techniques can provide very high compression ratios, however, and as such are often used when the information to be compressed does not require exact bit-for-bit replication upon decompression. As a result, lossy data compression techniques are useful in the compression of video or graphics images, audio signals, and other digital representation of analog information. Lossy compression techniques are often used in combination with lossless compression in these applications.

Typically, lossy data compression techniques may be considered as low-pass filters of the input information. High frequency effects in graphics images generally correspond to the edges of shapes in the image, and as such the application of lossy compression to these images is generally reflected as a loss of resolution at the edges of image elements, or by a loss of resolution in those portions of the image that change over time or space, with the low-frequency portions remaining substantially accurate when decompressed. Typically, the compression technique may therefore be considered as performed in three stages: encoding of the information into a compressible form (generally involving quantization of the information), decomposition of the encoded images, and thresholding of the decomposed images to eliminate the storage or communication of low coefficient values.

In order to obtain accurate decomposition in compression, many relatively complex transformation processes are known in the art. One type of decomposition, commonly referred to as JPEG (joint Photographic Experts Group) compression, divides each image into blocks, and applies a Discrete Cosine Transform to each block to produce arrays of coefficients which are then quantized and subjected to a difference algorithn. Another approach, referred to as fractal compression, divides each image into pixel groups, or tiles, and approximates each tile by either or both a contractive or rotational transformation based upon a reference region of the image, producing a compressed image consisting of a full representation of the reference region plus the transformation operators for each tile.

Wavelet-based compression techniques are also known in the art, and have been applied to still images and also motion pictures. PCT International Patent Application No. PCT/US95/12050, published by WIPO on Mar. 28, 1996 under International Publication Number WO 96/09718, commonly assigned herewith, describes several wavelet-based approaches to the compression of documents, including the use of dual basis wavelet functions, interpolatory wavelets, and wavelet packets. PCT International Patent Application No. PCT/US95/00563, published by WIPO on Jul. 20, 1995 under International Publication Number WO 95/19683, commonly assigned herewith, describes the use of boundary-spline-wavelet function pairs to compress and decompress motion pictures and other sequences of images.

According to these lossy compression methods, relatively complex mathematical operations (implemented, of course, as digital techniques operable on computers) are typically used in order to obtain high compression ratios with high fidelity representations upon decompression. Generally, these mathematical operations are required to be performed both by the computer system that is compressing the information, as well as by the computer system that is decompressing and displaying the information. This results in relatively high cost equipment to be used on both ends of each transmission.

FIG. 1 is a functional block illustration of a conventional type of process used in the compression and decompression of sample sequences, such as images. These conventional processes are referred to as "direct-sum decompositions", and are described in Chui, An Introduction to Wavelets (Academic Press, 1992), pp. 141–148, 199. An input image frame $C_i$, expressed as a sequence of coefficients, is decomposed by two filter functions $G(z)$, $H(z)$ in filter processes 2, 4, followed by downsampling by a factor of two (i.e., eliminating every other coefficient) in processes 3, 5, respectively. This decomposition is typically followed by quantization and encoding (not shown in FIG. 1), as is well known in the art, to achieve the desired compression ratio. As shown in FIG. 1, filter processes 2, 4, and downsampling processes 3, 5 are performed by the compression system CS. The output of filter process 2 and downsampling process 3 is a low-frequency component L of the image, and the output of filter process 4 and downsampling process 5 is a high-frequency component H of the image. As is typical in most lossy compression applications, much of the high frequency component H is eliminated by quantization and thresholding to obtain the desired compression ratio.

The decompression system DS reconstructs the image by applying upsampling process 7 (i.e., inserting zeroes between adjacent incoming coefficients) and, in process 8, applying a filter function P(z) to low-frequency component L. Similarly, the high-frequency component H is upsampled in process 9 and is filtered by function Q(z) in process 10. The output of filter processes 9, 10 are summed to arrive at the output image $C_o$, which is a close approximation to the input image $C_i$.

The filter functions G(z), H(z), P(z), Q(z) may be considered as convolution filters. For example, the filter function G(z) is of the form:

$$G(z) = \frac{1}{2} \sum_k g_k z^k$$

The filter functions H(z), P(z), Q(z) are similarly constructed. The coefficients $g_k$, $h_k$, $p_k$, $q_k$ are selected according to the desired convolution functions to be applied.

The decomposition of image $C_i$ from the $j_{th}$ level to the j-1th level is obtained by the convolution of the sequence of coefficients $\{c^j\}$ with the filter functions G(z), H(z), P(z), Q(z), to generate both a low-frequency sequence $\{c^{j-1}\}$ and a high-frequency sequence $\{d^{j-1}\}$, as follows:

$$c_k^{j-1} = \sum_l \left( \frac{1}{2} g_{2k-l} \right) c_l^j$$

$$d_k^{j-1} = \sum_l \left( \frac{1}{2} h_{2k-l} \right) c_l^j$$

In these decompositions, the index l corresponds to the convolution interval. Reconstruction is performed by the following convolution and sum:

$$c_k^j = \sum_l (p_{k-2l} c_l^{j-1} + q_{k-2l} d_l^{j-1})$$

As described in the Chui reference, the filter functions G(z), H(z), P(z), Q(z) must obey certain constraints in order for the direct-sum decomposition and reconstruction to occur properly. This requires:

$$\Delta_{P,Q}(z) := det \begin{bmatrix} P(z) & Q(z) \\ P(-z) & Q(-z) \end{bmatrix} \neq 0; |z| = 1$$

The decomposition filter functions G(z), H(z), are related to the reconstruction filter functions P(z), Q(z) as follows:

$$G(z) = \frac{Q(-z)}{\Delta_{P,Q}(z)} ; H(z) = \frac{-P(-z)}{\Delta_{P,Q}(z)}$$

It has been found that the direct-sum decomposition and reconstruction approach, when applied to the compression and decompression of images and other sizable data fields, results in significant computational complexity for both the compression system and also the decompression system. Such complexity is exacerbated as one considers the compression and decompression of temporal or spatial sequences of images.

It is therefore an object of the present invention to provide a method and system of image compression and decompression in which the computational requirements on either the compression or decompression side may be kept relatively simple.

It is a further object of the present invention to provide such a method and system in which complex computations may be performed at an intermediate system, permitting simple computer equipment to be used on both the compression and decompression sides.

It is a further object of the present invention to provide such a method and system that is particularly well suited for the compression and decompression of image sequences, either in the time or spatial domains.

It is a further object of the present invention to provide such a method and system that results in relatively high compression ratios.

Other objects and advantages of the present invention will be apparent to those of ordinary skill in the art having reference to the following specification together with its drawings.

SUMMARY OF THE INVENTION

The invention may be implemented into a compression and decompression system useful in communication or storage of compressed sequences of images, in either the temporal or spatial domains. According to the present invention, filtering functions are applied in both the compression and decompression systems that may be performed by relatively simple integer operations. A Cholesky filter, performed by way of forward and backward differencing, is applied in either the compression or decompression system, depending upon which system has the higher computational capability. This permits either the compression system or the decompression system to be implemented with relatively modest computational power, depending upon the application.

BRIEF DESCRIPTION OF THE DRAWINGS

FIG. 14 is a flow chart illustrating the method of intraframe reconstruction according to the method illustrated relative to FIG. 3a.

DETAILED DESCRIPTION OF THE PREFERRED EMBODIMENT

The present invention is useful for the compression and decompression of sequences of images. As is known in the art, data compression techniques are widely used in the communication of information, particularly in the communication of high volume data sets corresponding to graphic or visual images. In addition, data compression is useful in the archival storage of digital information to reduce the storage requirements for infrequently used, but important, information. In effecting data compression, it is of course desirable to obtain a high compression ratio (i.e., a high degree of compression), while still maintaining reasonably high fidelity in the decompressed information upon retrieval or receipt. In addition, the computational complexity, as reflected in the computing time or power required to effect the compression and decompression of the information, are also important considerations.

For purposes of his description, images may be considered as two-dimensional representations that convey visual information. These images, which be in monochrome, gray scale, or in color, may correspond to a photograph or frame of a motion picture, or may be a cross-sectional view of a three-dimensional volume. As is usual in digital graphics, each image is a two-dimensional array of picture elements, or pixels, in which each pixel is represented by an intensity value to convey its brightness. The simple monochrome image merely uses a single bit per pixel; gray scale monochrome images may use eight or sixteen bits per pixel to convey shades of gray. Color images are typically composite images, consisting of red, green, and blue color components corresponding to the red, green, and blue display elements, with each pixel being represented by twenty-four bits (eight per color component).

Sequences of images, in connection with which the present invention is particularly beneficial, consist of an ordered group of two-dimensional images that have a relationship with one another. This relationship may be a temporal relationship, as in the case of a motion picture where adjacent images correspond to similar views at adjacent samples in time, or may have a spatial relationship, as in the case of adjacent cross-sectional views corresponding to adjacent slices of a volume.

Figure 2:
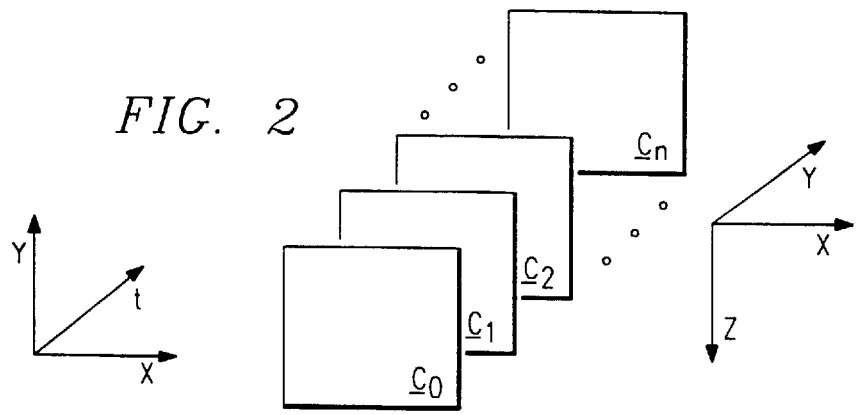
FIG. 2 is an illustration of a sequence of image frames, upon which the preferred embodiments of the invention are operable.

Referring first to FIG. 2, a sequence of image frames C are illustrated for purposes of defining the nomenclature to be used in this description. The sequence shown in FIG. 2 consists of an ordered set of n+1 image frames $C_O$ through $C_n$. Each image frame C is a two-dimensional graphical representation that has a relationship in the third dimension (i.e., the dimension not displayed in each image frame C) with the other image frames C in the sequence. This third dimension may be time, as in the case of a motion picture, or spatial, as in the case of a set of cross-sectional slice views.

Temporal and spatial coordinate systems are illustrated by the sets of axes shown in FIG. 2. The temporal system has three dimensions (x, y, t), with each image frame C being an image in the x and y dimensions, and with the sequence of image frames C ordered in time, each corresponding to a sample in time; the temporal system, of course, is applicable to a motion picture. The spatial system has three dimensions (x, y, z), with each image frame C being an image in the x and z dimensions, and with the sequence of image frames ordered in space along the y dimension; the spatial system is applicable to a series of cross-sectional slices of an object or a volume. Examples of spatial image frame sequences include three-dimensional seismic surveys of portions of the earth, as used in prospecting for oil and gas, computer-aided design (CAD) representations of a solid object, and tomographic images of a portion of the human body, such as are acquired through nuclear magnetic resonance (NMR) or magnetic resonance imaging (MRI). Of course, the selection of axes in the spatial system (i.e., the axes of each image plane) is somewhat arbitrary.

In both of the temporal and spatial cases, the relationship among the image frames C in the sequence are such that relatively minor changes in the image may be expected between adjacent frames, especially where the motion picture or three-dimensional imaging is of high resolution and fidelity.

Figure 1:
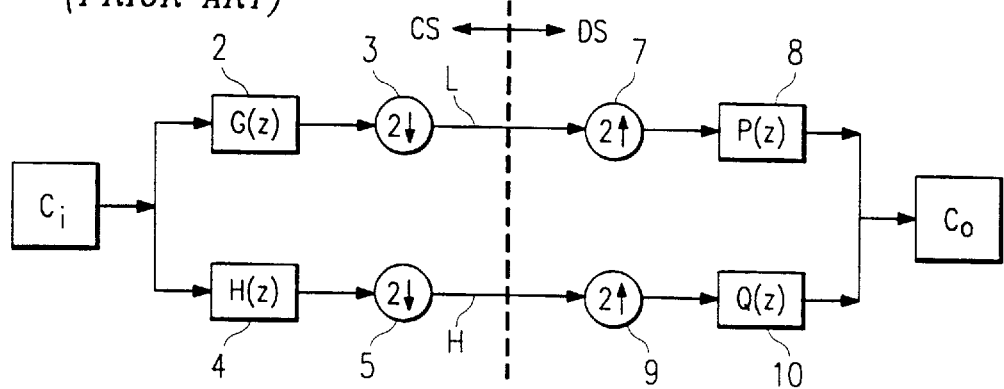
FIG. 1 is a functional block diagram illustrating a conventional filter scheme for compressing and decompressing images.

As noted above in the Background of the Invention relative to FIG. 1, conventional direct-sum decomposition and reconstruction generally results in significant computational complexity in both the compression and the decompression systems. It has been observed, in connection with the present invention, that many applications are present in which it would be preferable for much of the computing requirements to be concentrated on either the compression or decompression side. For example, in a video-on-demand system, it would be desirable for the computing requirements to be concentrated in the compression system, allowing the home decompression and display unit to be relatively simple and low cost. Conversely, in the transmission of motion pictures from outer space, it would be desirable for the complex computing requirements to be placed within the decompression system, permitting the transmitter in space to be relatively simple and utilize low power. According to the preferred embodiments of the invention, the compression and decompression of sequences of images may be performed in such a way as to permit the concentration of computing requirements in either the compression or decompression systems, as will now be described.

According to the preferred embodiments of the invention, each image frame may be compressed and decompressed according to a formula set consisting of five polynomials in the z-transform domain (i.e., in sampled time). The five polynomials include low-pass and high-pass decomposition filter functions P(z), Q(z), respectively, low-frequency and high-frequency reconstruction filter functions A(z), B(z), respectively, and a fifth filter function K(z) which may be merged into either the decomposition process in the compression system, or into the reconstruction process in the decompression system.

Figure 3A:
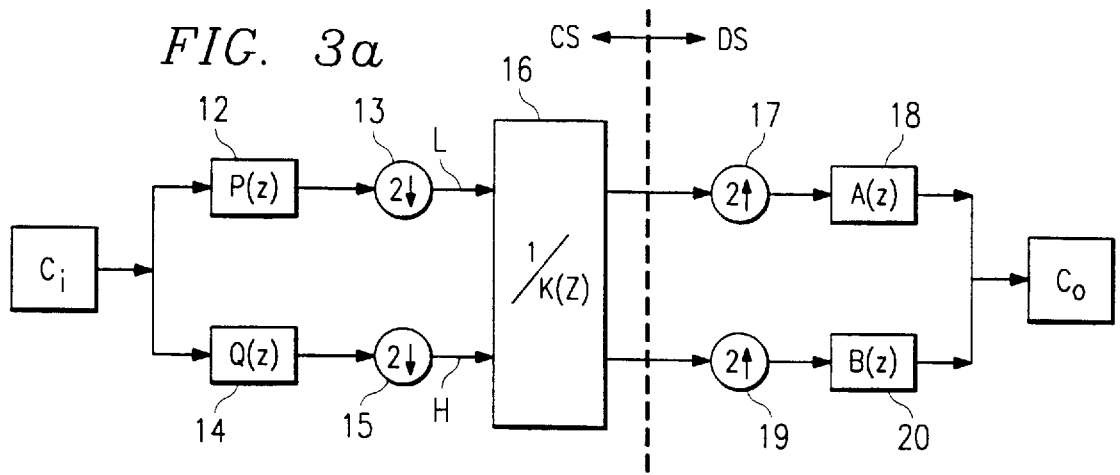
FIGS. 3*a* through 3*c* are functional block diagrams illustrating alternative filter schemes for compressing and decompressing images according to the preferred embodiments of the invention.

Referring next to FIG. 3a, a filter scheme according to a first preferred embodiment of the invention will be described, incorporating the filter functions described hereinabove. In the filter scheme of FIG. 3a, input image frame $C_i$ is filtered by low-pass filter function P(z) in process 12, and is then downsampled in process 13 to result in a low-frequency component L; similarly, input image frame $C_i$ is filtered by high-pass filter function Q(z) in process 14 and downsampled in process 15 to yield a high frequency component H. Low-frequency component L and high-frequency component H are filtered in process 16 by filter function 1/K(z), also occurring within the compression system CS as shown in FIG. 3a. Quantization, thresholding, and encoding of the output of filter process 16 prior to storage or transmission is then performed, as conventional in the art.

In decompression system DS, the low-frequency component L is upsampled in process 17 (by inserting zeroes between adjacent coefficients in the sequence), and applied to filter function A(z) in process 18; similarly, high-frequency component H is upsampled in process 17 and filtered by filter function B(z) in process 20. The output sequences from filter processes 18, 20 are summed into output image frame $C_o$, which is a faithful representation of the input image frame $C_i$.

It has been found that proper selection of filter functions P(z), Q(z), K(z), A(z), B(z), can result in filter functions P(z), Q(z), A(z), B(z) being relatively simple in the computational sense, and in filter function K(z) being mergeable into either the decomposition process or the reconstruction process. According to the preferred embodiments of the invention, a set of filter functions P(z), A(z) that correspond to $m^{th}$ order averaging, filter functions Q(z), B(z) that correspond to $m^{th}$ order differencing, and filter function K(z) that corresponds to Cholesky decomposition, provides these properties. The formula set of filter functions P(z), Q(z), K(z), A(z), B(z) differs, depending upon whether the order m is even or odd. For m odd, the filter functions are as follows:

$$P(z) = \left( \frac{1+z}{2} \right)^m$$

$$Q(z) = P(-z) = \left( \frac{1-z}{2} \right)^m$$

$$K(z^2) = z^{-1}(P(z)^2 - P(-z)^2)$$

$$A(z) = z^{-1}P(z)$$

-continued $$B(z) = -z^{-1}P(-z)$$

For m even:

$$P(z) = \left( \frac{1+z}{2} \right)^m$$

$$Q(z) = z^{-1}P(-z) = z^{-1}\left( \frac{1-z}{2} \right)^m$$

$$K(z^2) = (P(z)^2 + P(-z)^2)$$

$$A(z) = P(z)$$

$$B(z) = z^2 Q(z) = zP(-z)$$

Figure 3B:
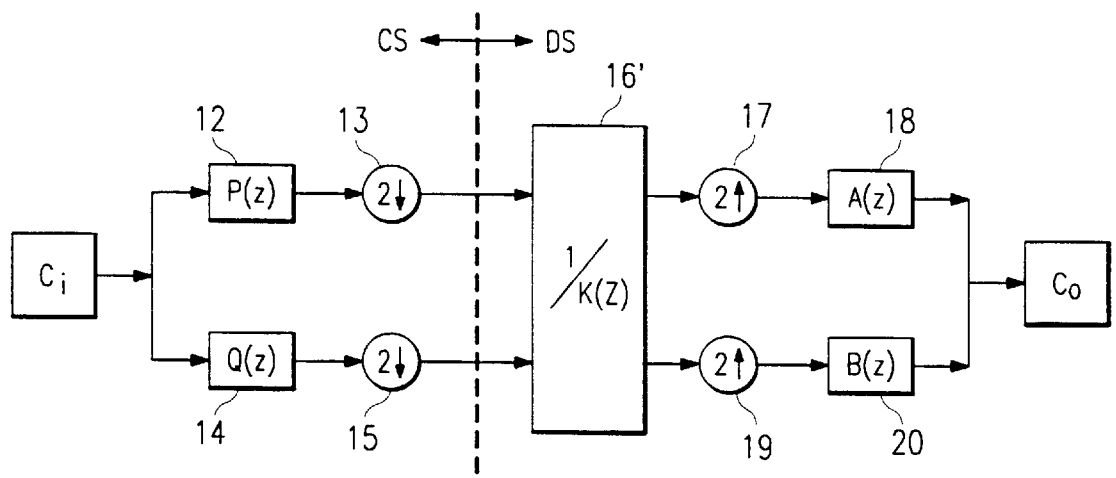

Reference is now made to FIG. 3b, in which like reference numerals refer to like processes as in FIG. 3a. As is evident from FIG. 3b, Cholesky decomposition filtering process 16', in which the filter function 1/K(z) is applied, is now performed by decompression system DS, prior to upsample processes 17, 19, and as such is merged within the decompression or reconstruction process in generating the decompressed image $C_o$. The present invention provides the important capability of moving this filtering process into either the compression or decompression systems, depending upon where the desired computational complexity is needed.

Figure 3C:
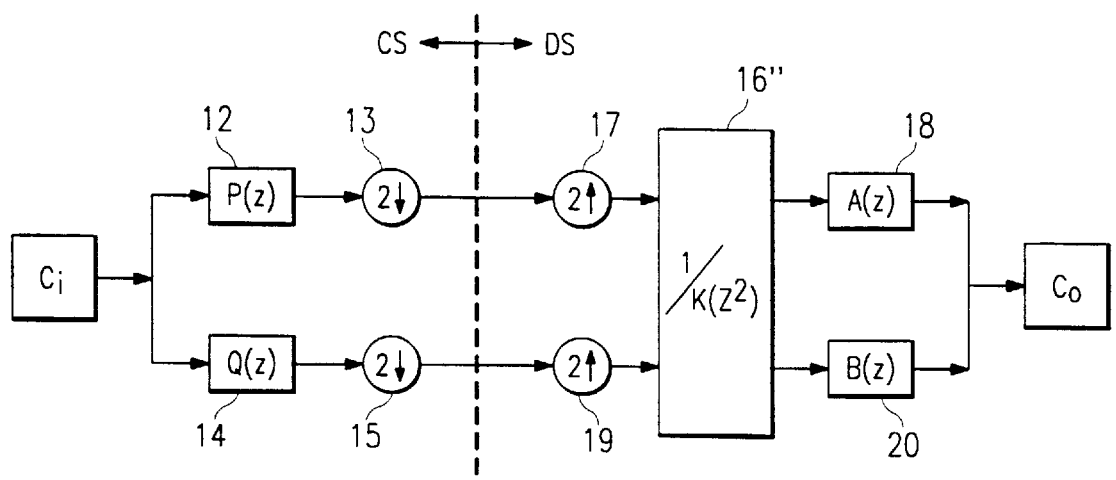

It has been further found in connection with the present invention that one may move Cholesky decomposition filter process 16 to after upsample processes 17, 19 in the decompression system, by changing the filter function to $1/K(z^2)$. FIG. 3c illustrates this alternative process, in which Cholesky decomposition filter process 16" is shown as being after upsample processes 17, 19. This permissible modification is because a polynomial $\Delta(z)$ exists where, for m even:

$$\Delta(z) = (P(z)^2 + P(-z)^2)$$

and, for m odd:

$$\Delta(z) = z^{-1}(P(z)^2 - P(-z)^2)$$

and where the polynomial $\Delta(z)$ is always a polynomial of $z^2$. In other words, a polynomial K(z) exists for which $K(z^2) = \Delta(z)$. Equivalently, one may insert the Cholesky decomposition filter $1/K(z^2)$ earlier into the compression process, prior to downsampling processes 13, 15, based upon the same relationship between polynomials $K(z^2)$ and $\Delta(z)$.

Accordingly, the preferred embodiments of the invention include a first embodiment of the invention in which the Cholesky decomposition is merged within the decomposition processes performed by the compression system, and a second embodiment of the invention in which the Cholesky decomposition is merged within the reconstruction processes performed by the decompression system. These preferred embodiments of the present invention will now be generally described, with details of each embodiment to follow the general description.

Figure 4A:
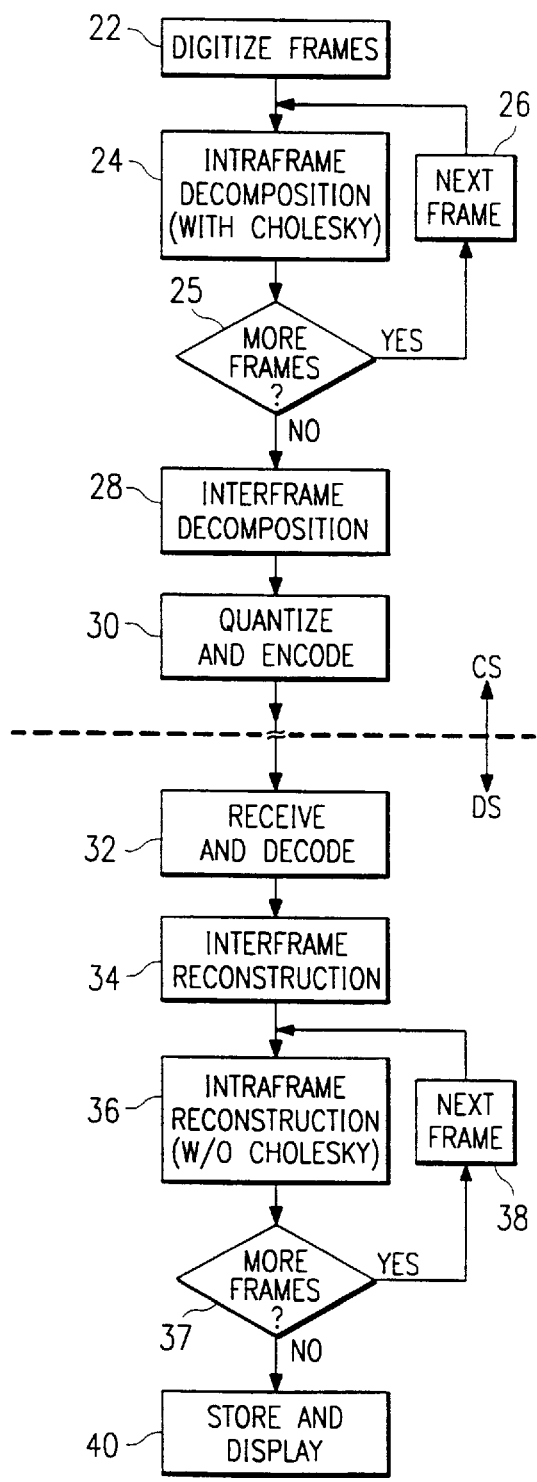
FIGS. 4*a* and 4*b* are flow charts illustrating methods of compressing and decompressing sequences of images according to the preferred embodiments of the invention.

Referring first to FIG. 4a, a method of compressing and decompressing a sequence of images according to a first preferred embodiment of the invention, specifically in which the Cholesky decomposition is performed within the compression system is illustrated. This method begins with process 22, in which the image frames are digitized upon capture (if not already in a digital form, as is the case with computer-generated images such as those used in seismic surveys). The digitized frames each consist of an array of pixels, each pixel represented by a number of bits ranging from one (monochrome) to twenty-four (full color), depending upon the nature of the image and processing desired.

The digitized frames are then each decomposed individually, in intraframe decomposition process 24. As will be described in detail hereinbelow, intraframe decomposition process 24 may be performed multiple times on each frame, depending upon the compression ratio desired. Intraframe decomposition process 24 according to this embodiment of the invention incorporates the Cholesky decomposition process, and as such corresponds to the filter scheme described hereinabove relative to FIG. 3a, where filter process 16 is performed in the compression system. According to the preferred embodiments of the present invention, and as will be described in further detail hereinbelow, the decomposition is performed both in the horizontal and vertical direction. Process 24 thus generates multiple sequences of coefficients corresponding to various low-frequency and high-frequency components of the frame. Upon completion of intraframe decomposition process 24 for an image frame, decision 25 is performed to determine if additional image frames in the sequence are to be decomposed; if so, process 26 selects the next image frame for decomposition, and intraframe decomposition process 24 is repeated for that next frame.

Upon completion of intraframe decomposition process 24 for all of the frames in the sequence (i.e., decision 25 is NO), interframe decomposition process 28 is next performed. Interframe decomposition process 28, according to the preferred embodiments of the invention, combines adjacent decomposed image frames with one another to achieve additional compression, again producing sequences of coefficients corresponding to low-frequency and high-frequency components of the frames. The interframe decomposition is enabled by the realization that adjacent frames in time or space, when representative of real time or spatial sequences with a reasonable degree of resolution, generally vary only slightly relative to one another. Accordingly, as will be noted hereinbelow, additional compression may be obtained in the low-frequency and high-frequency decomposition of adjacent pairs or small groups of frames, as performed in process 28.

Following interframe decomposition process 28, process 30 is next performed in preparation for the transmission or storage of the compressed image frame sequence. Process 30 includes quantization of the coefficients generated from processes 26, 28, which effectively reduces the number of bits required for the representation of each coefficient value. This quantization may also include thresholding of the coefficient values, such that coefficients of a magnitude below a certain threshold value are zeroed; this quantization typically reduces the volume of data required for representation of the higher frequency components of the decomposition. Process 30 also includes the necessary formatting of the coefficient sequences into a bit stream or other format suitable for the communication or archival storage of the sequence.

According to this embodiment of the invention, all processes up to and including process 30 are performed by the compression system, as indicated by the CS/DS boundary of FIG. 4a. Following transmission of the compressed sequence, or upon retrieval of the compressed sequence from archive storage, the decompression of the image sequences begins with process 32 in which the bit stream is received and decoded by the decompression system, and placed into a form suitable for reconstruction of the image sequence. Process 34 is next performed by the decompression system to perform interframe reconstruction, in effect performing the inverse of interframe decomposition process 28 performed by the compression system in process 28. The results of interframe reconstruction process 34 are coefficient sequences assigned to individual image frames.

Following interframe reconstruction process 34, intraframe reconstruction process 36 is performed on the coefficient sequences corresponding to individual frames, on a frame-by-frame basis. Intraframe reconstruction process 34 corresponds substantially to the inverse of intraframe decomposition process 24 performed by the compression system, except that the Cholesky filtering process need not be included in process 34, as illustrated relative to the filter scheme of FIG. 3a. According to this embodiment of the invention, therefore, the computational load placed upon the decompression system is relatively light, as only the application of the A(z), B(z) filters (i.e., processes 18, 20 of FIG. 3a) is required in intraframe reconstruction process 36. Upon reconstruction of each frame, decision 37 determines whether additional frames remain to be reconstructed. If so, process 38 advances to the next frame for application to intraframe reconstruction process 36. Upon completion of intraframe reconstruction process 36 for all of the frames in the sequence (i.e., decision 37 is NO), process 40 may be performed to store or display the sequence of images in the manner desired.

As noted in the foregoing description of the process of FIG. 4a according to this first embodiment of the invention, the computational complexity of the compression and decompression process may be concentrated in the compression system. Distribution of the computing load toward the compression system is particularly beneficial in particular system environments, an example of which will now be described in FIG. 5a.

Figure 5A:
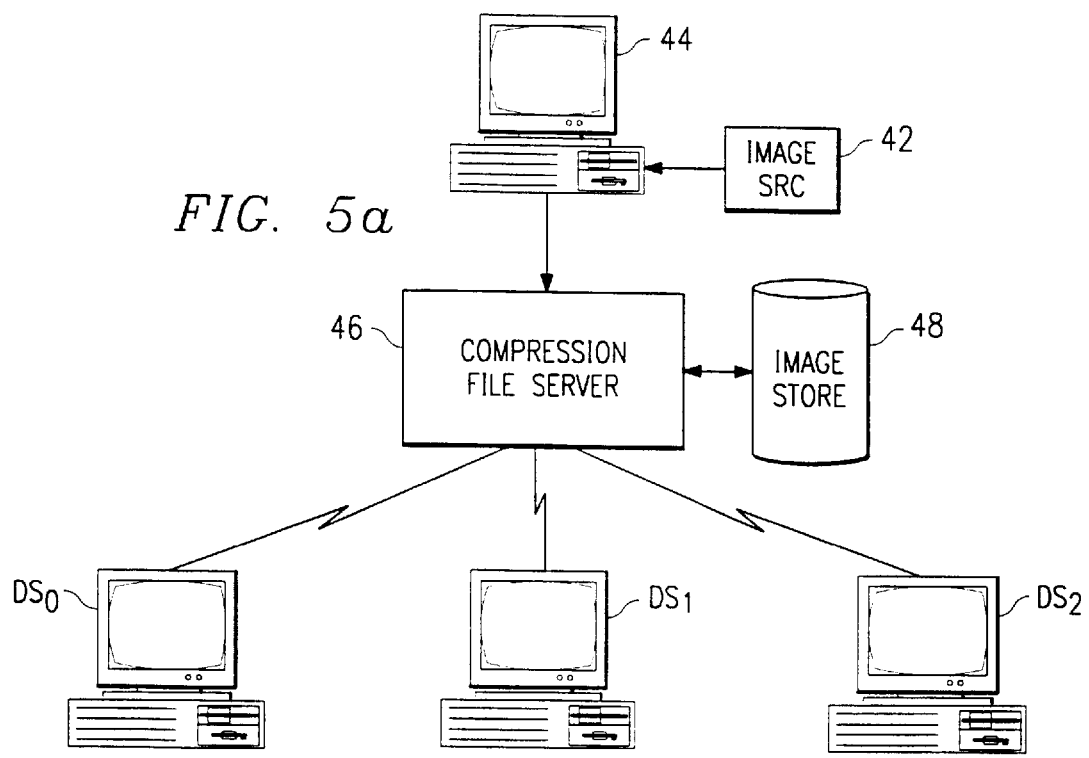
FIGS. 5*a* and 5*b* are exemplary computer systems for performing the methods of compressing and decompressing sequences of images illustrated in FIGS. 3*a* and 3*b*, respectively.

In the arrangement of FIG. 5a, image source 42 corresponds to a video camera or other input providing motion pictures, a digital storage device containing a data base of seismic survey data or series of tomography images, or any other similar source of a sequence of images to be compressed for communication, under the control of local computer 44. Local computer 44 may perform the digitization process 22 illustrated in FIG. 4a. The sequence of images are forwarded to compression file server 46, which may be a high-performance workstation or other similarly powerful computer. In the exemplary system of FIG. 5a, compression file server 46 performs the compression processes 24 through 30, including the Cholesky decomposition processes described hereinabove, storing the compressed image sequences in image storage 48, which may be a bank of fixed disk storage or other high density, high volume computer storage.

Decompression systems $DS_0$ through $DS_2$ represent a group of remote computing devices for decompressing and displaying sequences of images communicated thereto from compression file server 46. Decompression systems $DS_0$ through $DS_2$ may therefore correspond to home theater systems for showing video-on-demand, remote user terminals in a network, personal computers accessing compression file server 46 over the Internet, or the like. According to this embodiment of the invention, decompression systems $DS_0$ through $DS_2$ may be computing devices of relatively modest power and performance, considering that the computational requirements of the compression process are concentrated in compression file server 46, while still permitting the viewing of the sequences of images at high resolution and high speed (including real-time decompression of motion pictures). This ability to enable decompression using display systems of modest computing power is an important benefit provided by the present invention.

Figure 4B:
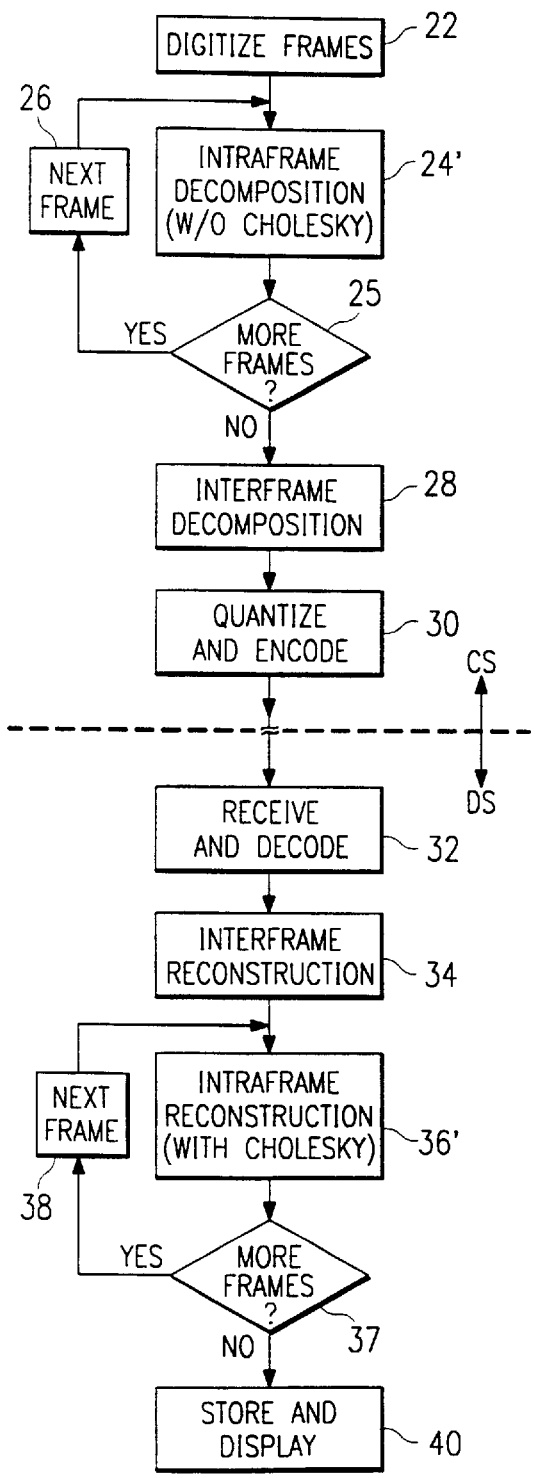

Conversely, as noted above, the bulk of the computational requirements may instead be distributed toward the decompression system, as will now be described relative to a second preferred embodiment of the present invention illustrated in FIGS. 4b and 5b. FIG. 4b illustrates an analogous method to that of FIG. 4a, using like reference numerals for similar processes. As shown in FIG. 4b, the input frames are again digitized in process 22, and forwarded individually to intraframe decomposition process 24'. Intraframe decomposition process 24' in this embodiment of the invention does not include the Cholesky decomposition filtering process, and thus corresponds to the filter scheme illustrated in FIG. 3b. Process 24' is performed on individual frames as before, until no frames remain to be processed (i.e., decision 25 is NO), following which interframe decomposition process 28, and quantization and encoding process 30, are performed as before. Each of these processes are performed by the compression system, which may be of relatively modest capability as will be illustrated hereinbelow.

Following transmission or storage, the decompression of the image sequences begins, as before, with decoding process 32 performed by the decompression system. Interframe reconstruction process 34 is performed as the inverse of interframe decomposition process 28, to produce coefficient sequences corresponding to individual frames of the compressed sequence. According to this second embodiment of the invention, however, the decompression process continues with intraframe reconstruction process 36' which includes the Cholesky filtering indicated by the filter scheme of FIG. 3b. Intraframe reconstruction process 36' is repeated for each of the frames in the sequence (via decision 37 and process 38), following which the sequence of image frames has been restored, and is available for storage and display in process 40.

The method of FIG. 4b according to this embodiment of the invention is particularly well suited for use in environments where only modest computing capability may be available for the compression system. An example of such an arrangement is illustrated in FIG. 5b, where image source 42 again corresponds to a video camera, data base, or other source of image sequences. In this system, compression system CS receives the sequences of images from image source 42, performs the compression processes 22 through 30 of FIG. 4b, and transmits the compressed image sequences to decompression file server 50. The arrangement of FIG. 5b is particularly useful in the compression of image sequences obtained at remote locations in real time, such as the acquisition of seismic survey signals in the field, and the communication of video images from outer space.

Figure 5B:
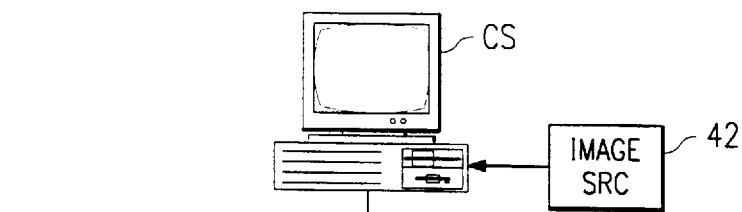

Decompression file server 50 in the system of FIG. 5b performs processes 32 through 40 illustrated in FIG. 4b, including the Cholesky filtering according to the filter scheme of FIG. 3b. As such, it is contemplated that decompression file server 50 is a relatively high performance workstation that is well-suited for complex computational tasks. Decompression file server 50 stores the results of the decompression processes in image store 52, for later retrieval and viewing by user system 50 coupled thereto.

According to this second embodiment of the invention, therefore, the computational burden is concentrated within the decompression system. This permits the compression system to be relatively modest, which is of particular benefit in many situations.

The system arrangements of FIGS. 5a and 5b are, of course, presented by way of example only. It is contemplated that many variations upon these examples will become readily apparent to those of ordinary skill in the art having reference to this description. For example, it is contemplated that the same low-end computer system may serve as a compression system for certain uses, and as a decompression system for others. For example, a home computer system may serve as a compression system in uploading motion picture sequences (e.g., home videos) to an Internet server, while serving as a decompression system in receiving motion pictures from a video-on-demand service; in each case, the computationally complex Cholesky decomposition may be located in the servers, rather than in the home computer system.

Given the foregoing general description of the alternative embodiments of the invention, the compression and decompression systems and methods will now be described in detail, beginning with the method of FIG. 4a, which describes a method of compressing and decompressing a sequence of images according to the first preferred embodiment of the invention, specifically in which the Cholesky decomposition is performed within the compression system.

Digitization process 22 is first performed as noted hereinabove, according to conventional techniques for rendering a digital representation of sequences of images. Of course, if the sequences of images are initially produced digitally, digitization process 22 will be inherent in the production of the sequences. Upon the digitization of the image frames to be compressed, intraframe decomposition process 24 is next performed according to this embodiment of the invention. Referring now to FIGS. 6, 7, and 8a through 8d, intraframe decomposition process 24 according to this embodiment of the invention will now be described in detail.

Figure 8A:
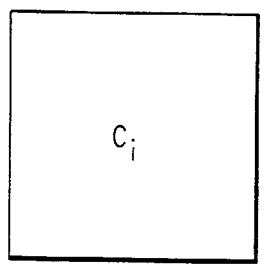
FIGS. 8*a* through 8*d* are illustrations of an image at various stages of the intraframe decomposition method of FIG. 6.

In process 54, a single digitized frame $C_i$ is received, and prepared for decomposition. FIG. 8a illustrates this single frame $C_i$; as noted above, frame $C_i$ is constructed as an array of pixels arranged in rows and columns, with the image information represented by one or more bits per pixel. One may thus consider frame $C_i$ as a two-dimensional sequence of coefficients $\{c_{m,n}\}$, each coefficient corresponding to a pixel in the image, with the index m corresponding to the row in which the pixel resides, and the index n corresponding to the column in which the pixel resides. According to this embodiment of the invention, the two-dimensional array will be decomposed into a sequence of coefficients in both the row and column directions; in this example, row-wise decomposition is performed first, followed by column-wise decomposition. Of course, the directional order in which the decomposition is performed is arbitrary, and as such column-wise decomposition may be performed first, followed by row-wise decomposition, with equivalent results.

According to this embodiment of the invention, process 56 is next performed, in which row-wise average and difference filtering is applied to the input frame $C_i$. As illustrated in the filter scheme of FIG. 7, filtering process 56 includes the application of $m^{th}$ order average filter P(z) and $m^{th}$ order difference filter Q(z) to input frame $C_i$, performed in the row-wise direction in this example. The filter functions P(z), Q(z) are derived from the generalized polynomials described hereinabove, depending upon the order of filtering desired. In this embodiment of the invention, filtering process 56 may be performed by way of relatively simple digital filter techniques, for example as performed by a digital signal processor, or by way of specific custom computer hardware designed to perform the filter of the desired order. As will be evident from the following, the application of these filter functions will generally involve only integer processing, further facilitating their performance by relatively unsophisticated computer equipment. By way of example, the filter functions P(z), Q(z) will now be expressed both mathematically and also in the form of hardware functionality, for the examples of second, third, and fourth order (m=2, m=3, m=4, respectively) filters.

For the case where m=2, the second order filter functions P(z), Q(z) may be explicitly expressed as follows:

$$P(z) = \tfrac{1}{4} + \tfrac{1}{2}z + \tfrac{1}{4}z^2$$

$$Q(z) = \tfrac{1}{4}z^{-1} - \tfrac{1}{2} + \tfrac{1}{4}z$$

Figure 9A:
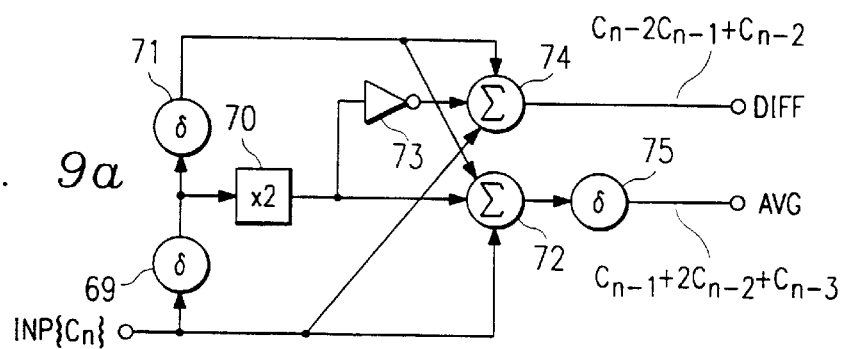
FIGS. 9*a* through 9*c* are electrical diagrams, in schematic form, functionally illustrating circuitry or computer operations for performing average and difference filtering as used in intraframe decomposition according to the preferred embodiments of the invention, for various orders of filtering.

Referring now to FIG. 9a, a functional hardware implementation of the second order filter functions P(z), Q(z) will now be described. As illustrated in FIG. 9a, the input coefficient sequence $\{c_n\}$, represented by a sequence of digital words, is received at input node INP, and is applied to delay stage 69 (corresponding to the factor z in the z-transform domain); input mode INP is also connected directly to summation nodes 72, 74. The output of delay stage 69 is connected to delay stage 71, and to the input of multiplier 70. Multiplier 70 multiplies the coefficient presented to its input by a factor of two, which may be accomplished by a simple left-shift of each digital coefficient value received. The output of multiplier 70 is applied directly to summation node 72, and to summation node 74 via inverter 73. The output of second delay stage 71 is applied to both of summation nodes 72, 74. The output of summation node 74 on line DIFF thus corresponds to the second order difference filtering of the input sequence $\{c_n\}$; for each input coefficient $c_n$, the difference value on line DIFF is the sum $c_n - 2c_{n-1} + c_{n-2}$. The output of summation node 72 is delayed by an additional delay stage 75, and is presented on line AVG as the second order average $c_{n-1} + 2c_{n-2} + c_{n-3}$; the additional delay stage 75 for the second order sum is required for this even-numbered order average and difference filtering.

For the case of m=3, third order difference and average filtering process 56 may be accomplished by filter functions P(z), Q(z) defined as follows:

$$P(z) = \frac{1}{8} + \frac{3}{8}z + \frac{3}{8}z^2 + \frac{1}{8}z^3$$

$$Q(z) = \frac{1}{8} - \frac{3}{8}z + \frac{3}{8}z^2 - \frac{1}{8}z^3$$

Figure 9B:
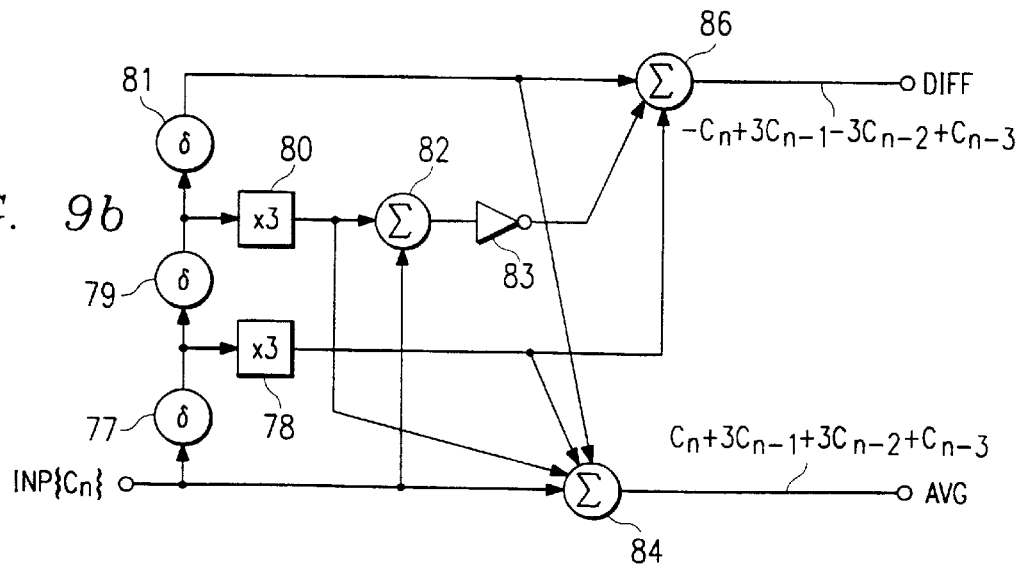

FIG. 9b illustrates a functional hardware implementation of the third-order difference and averaging filtering. In this example, input node INP is applied directly to summation node 84 and also to delay stage 77. The output of delay stage 77 is applied to x3 multiplier 78, the output of which is applied to summation nodes 84, 86. Second delay stage 79 also receives the output of delay stage 77, and has an output applied to x3 multiplier 80. The output of multiplier 80 is applied to summation node 82, along with input node INP; the output of summation node 82 has its sign changed by inverter 83, and is then applied to summation mode 86. Third delay stage 81 receives the output of second delay stage 79, and applies its output to summation nodes 84, 86. The output of summation node 84 is the third order average $c_n + 3c_{n-1} + 3c_{n-2} + c_{n-3}$, and the output of summation node 86 is the third order difference (oppositely signed) $-c_n + 3c_{n-1} - 3c_{n-2} + c_{n-3}$. Accordingly, the hardware realization of third order difference and averaging filter process 56 is also relatively straightforward, and involves only integer processes.

For m=4, the fourth order average and difference filter functions P(z), Q(z) may be realized as follows:

$$P(z) = \frac{1}{16} + \frac{4}{16}z + \frac{6}{16}z^2 + \frac{4}{16}z^3 + \frac{1}{16}z^4$$

$$Q(z) = \frac{1}{16}z^{-1} - \frac{4}{16} + \frac{6}{16}z - \frac{4}{16}z^2 + \frac{1}{16}z^3$$

Figure 9C:
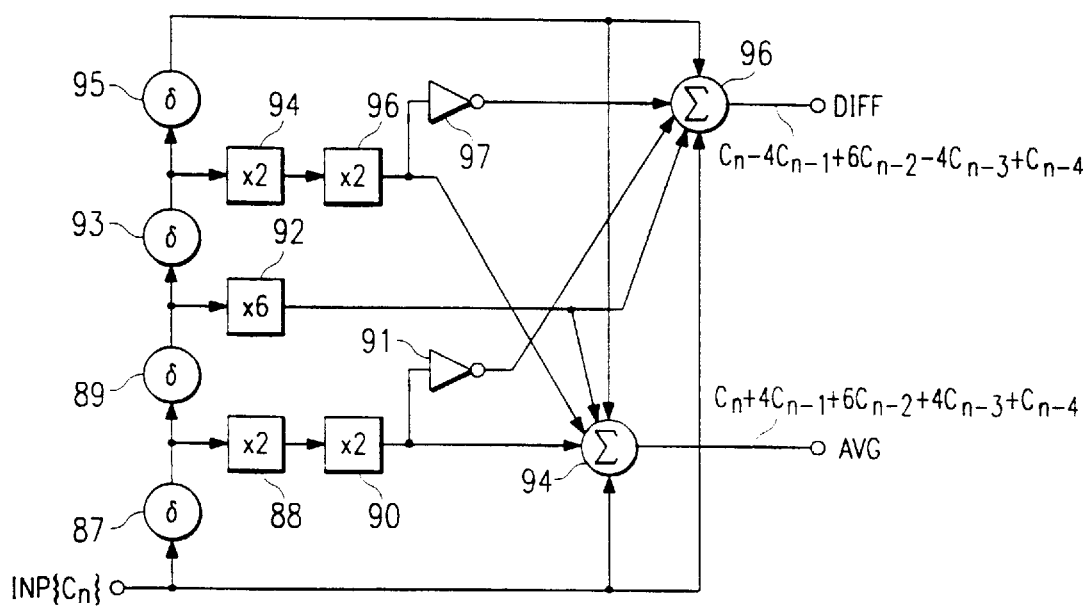

FIG. 9c illustrates a hardware realization of these fourth order average and difference filter functions. Input node INP is applied to summation nodes 94, 96 directly, and also to delay stage 87. The output of delay stage is multiplied by four via a pair of single-bit left-shift multipliers 88, 90, with the output of multiplier 90 applied directly to summation node 94 and via sign change inverter 91 to summation node 96. A second delay stage 89 receives the output of delay stage 87, and applies its output to x6 multiplier 92, the output of which is applied directly to both of summation nodes 94, 96. Third delay stage 93 receives the output of second delay stage 89, and applies its output to a pair of single-bit left-shift multipliers 94, 96, with the output of multiplier 96 applied directly to summation node 94 and via sign-change inverter 97 to summation node 96. A fourth delay stage 95 receives the output of third delay stage 93, and has its output connected directly to summation nodes 94, 96. The output of summation node 94 on line AVG thus corresponds to the fourth-order average $c_n + 4c_{n-1} + 6c_{n-2} + 4c_{n-3} + c_{n-4}$, and the output of summation node 96 on line DIFF corresponds to the fourth-order difference $c_n - 4c_{n-1} + 6c_{n-2} - 4c_{n-3} + c_{n-4}$.

It is contemplated that one of ordinary skill in the art, having reference to this description, will be readily able to similarly construct average and difference filtering circuitry or corresponding computer program for higher order filtering as desired. In any case, it will be readily apparent that the implementation of the average and difference filtering is relatively simple, and may be either implemented in or performed by computing circuitry of modest performance, according to modem standards, especially considering that only integer processing is required.

Referring back to FIG. 6, process 56 is performed by applying each row of image frame $C_i$ as a sequence of coefficients $\{c_n\}$ to input node INP of a circuit implementation such as that illustrated in FIGS. 9a, 9b, 9c, or the like. The average output AVG is then forwarded to downsample process 58a, in which alternate coefficients from the averaging filtering are discarded; similarly, the difference output DIFF is forwarded to downsample process 58d, in which its alternate coefficients are discarded.

Each of the downsampled average and difference coefficient sequences are now processed according to Cholesky decomposition processes 60a, 60d. Cholesky decomposition processes 60a, 60d correspond to the application of the 1/K(z) filter of FIG. 7, using the filter function therefor derived in the general sense, as described hereinabove. For the example of m=2, the explicit form of filter polynomial K(z) is expressed as follows:

$$K(z) = \frac{1}{8} + \frac{6}{8}z + \frac{1}{8}z^2$$

For the case of m=3, the explicit form of filter polynomial K(z) is:

$$K(z) = \frac{6}{32} + \frac{20}{32}z + \frac{6}{32}z^2$$

For the case of m=4, the explicit form of filter polynomial K(z) is:

$$K(z) = \frac{1}{2^7} + \frac{28}{2^7} z + \frac{70}{2^7} z^2 + \frac{28}{2^7} z^3 + \frac{1}{2^7} z^4$$

In the general case, the application of the appropriate filter function $1/K(z)$ may be performed by way of a matrix operation, if desired. In connection with the preferred embodiments of the invention, however, it has been found that the use of forward and backward differencing may be applied, in a recursive manner, in performing processes 60a, 60d.

By way of example, referring back to the m=2 case, one may factor the filter function $K(z)$ as follows:

$$K(z) = \frac{1}{8} (z - \alpha) \left( z - \frac{1}{\alpha} \right)$$

where $\alpha = 3 - 2\sqrt{2}$. Forward and backward difference may be applied to an input sequence $\{x_n\}$ (in the general sense; of course, the average and difference filter output is applied) to generate an output sequence $\{y_n\}$ in three steps. Firstly, a first intermediate sequence $\{t_n\}$ is generated by way of forward differencing (i.e., recursively subtracting a prior value in the output sequence) as follows:

$$t_n = x_n - \alpha t_{n-1}, \text{ for } n = \ldots -2, -1, 0, 1, 2, \ldots$$

Secondly, a second intermediate sequence $\{s_n\}$ is generated by backward differencing as follows:

$$s_n = t_n - \alpha s_{n+1}, \text{ for } n = \ldots 2, 1, 0, -1, -2, \ldots$$

The values of $t_n$ and $s_n$ may be assumed to be zero if n is far out of the range of the signal, since the value of $\alpha$ is relatively small. Following generation of the second intermediate sequence $\{s_n\}$, the output sequence $\{y_n\}$ is generated, for the m=2 case, as follows:

$$y_n = 8\alpha s_n, \text{ for } n = \ldots -2, -1, 0, 1, 2, \ldots$$

Similar forward and backward differencing may be implemented for other orders m. For example, in the case of m=3, with the form of $K(z)$ noted above, one may factor the polynomial as follows:

$$K(z) = \frac{3}{16} (z - \alpha) \left( z - \frac{1}{\alpha} \right)$$

where $\alpha = \frac{1}{3}$. For the case of m=4 and higher orders, the polynomial filtering function $K(z)$ becomes more complicated. In general, the polynomial $K(z)$ is factored as follows:

$$K(z) = c(z - \alpha_1) \ldots (z - \alpha_k) \left( z - \frac{1}{\alpha_1} \right) \ldots \left( z - \frac{1}{\alpha_k} \right)$$

where c is a constant, and where the series of $\alpha$ values all have an absolute value of less than unity. Forward differencing then is performable by a recursive series:

$$t_n = x_n - \alpha_1 t_{n-1} - \alpha_2 t_{n-2} - \ldots - \alpha_k t_{n-k}, \text{ for } n = \ldots -2, -1, 0, 1, 2, \ldots$$

Secondly, a second intermediate sequence $\{s_n\}$ is generated by backward differencing as follows:

$$s_n = t_n - \alpha_1 s_{n+1} - \alpha_2 s_{n+2} - \ldots - \alpha_k s_{n+k}, \text{ for } n = \ldots 2, 1, 0, -1, -2, \ldots$$

The generalized output sequence $\{y_n\}$ is then generated as $y_n = cs_n$, over the range of the index n. For the case of m=4, the two $\alpha$ values may be readily calculated as:

$\alpha_1 = 0.4860288221$ $\alpha_2 = 0.01766480087$

Figure 6:
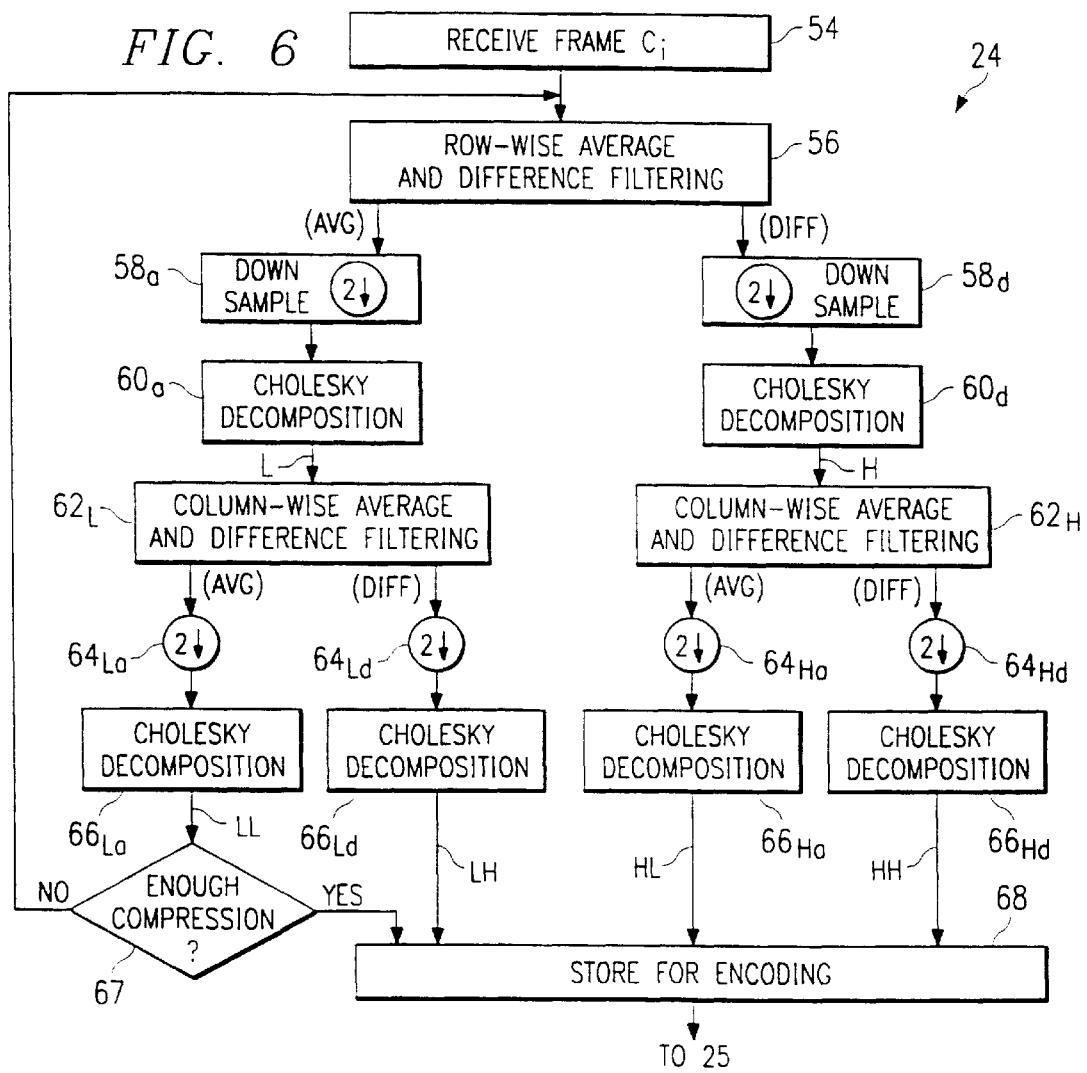
FIG. 6 is a flow chart illustrating the method of intraframe decomposition of an image according to the first preferred embodiment of the invention.
Figure 7:
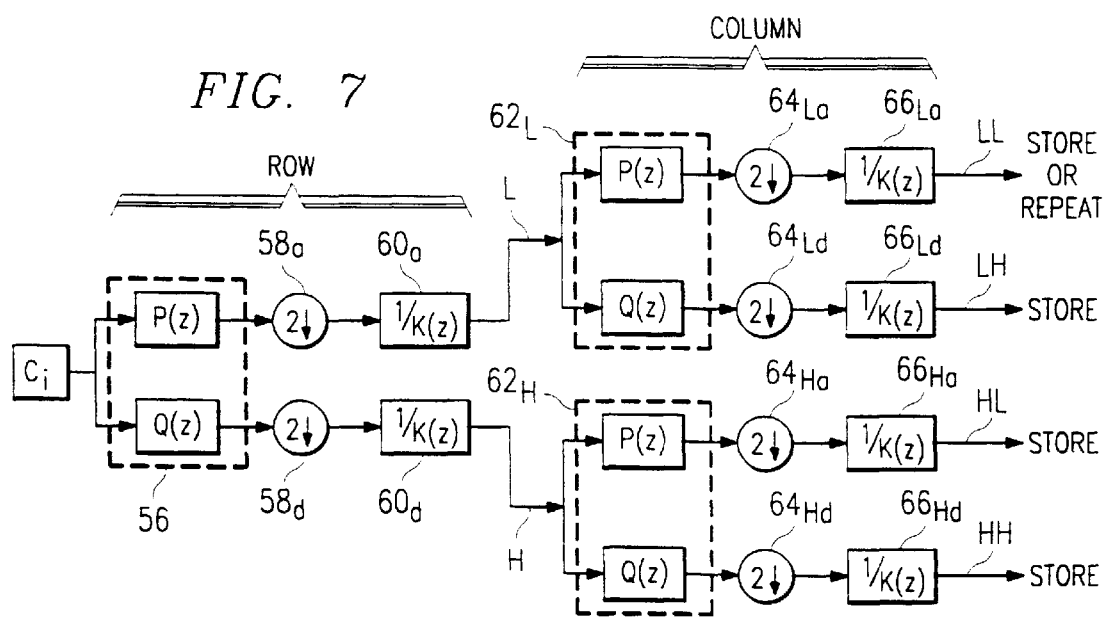
FIG. 7 is a functional block diagram illustrating the filter scheme for intraframe decomposition according to the method illustrated relative to FIG. 6.

Processes 60a, 60d are thus performed upon the down-sampled average and difference sequences, respectively, as illustrated in FIGS. 6 and 7. Given the recursive nature of the forward and backward differencing operations described hereinabove, and considering that the $\alpha$ factors are at least non-integer, and may be irrational, it is contemplated that relatively high-performance numerical processing is preferably used for performing the Cholesky decomposition processes. For example, computer workstations that incorporate digital signal processing capability are preferred systems for performing processes 60a, 60d according to this first preferred embodiment of the invention.

Figure 8B:
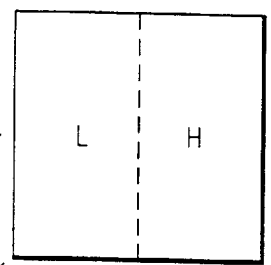

Accordingly, in processes 60a, 60d, the average and difference coefficient sequences AVG, DIFF, respectively, are each transformed by way of forward and backward differencing operations into a low-frequency component L and a high-frequency component H. These components L, H are preferably stored as an array of the same size as input frame $C_i$, in a manner corresponding to the rows given rise to the decomposition. FIG. 8b illustrates the preferred arrangement of this array, where in each row of the array the left-hand columns correspond to the low-frequency component L output by process 60a for the coefficients in that row of input frame $C_i$, and where the right-hand columns of each row similarly correspond to the high-frequency component H.

Process 62L is next performed upon low-frequency component L, applying the average and difference filtering described hereinabove for process 56, but in the column-wise direction. Similarly, high-frequency component H is filtered by average and difference filtering process 62H, also in the column-wise direction. Each of processes 62L, 62H generate an average output AVG and a difference output DIFF, as before. Downsampling is performed upon the average and difference outputs from each of processes 62L, 62H, by way of downsampling processes 64La, 64Ld, 64Ha, 64Hd. In processes 66La, 66Ld, 66Ha, 66Hd, Cholesky decomposition is performed again upon each of the down-sampled column-wise average and difference components, in the same manner as described hereinabove for processes 62.

Figure 8C:
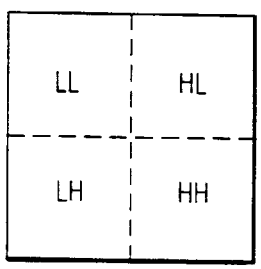

Following processes 66, the input image $C_i$ has been decomposed into low and high frequency components in two directions, resulting in four components. The high-frequency component H from the row-wise decomposition is decomposed into a low-frequency component HL and a high-frequency component HH; the low-frequency component L is similarly decomposed into a low-frequency component LL and a high-frequency component LH. According to this embodiment of the invention, the LL component corresponds to the "blur" image, and thus consists of the low frequency components of the input image $C_i$. The other components LH, HL, HH correspond to higher-frequency portions of the image, for example edges of objects and other locations in which the image rapidly changes. The four components LL, LH, HL, HH may be arranged in memory in similar space as the input array $C_i$, as illustrated in FIG. 8c. Since this is the first level of decomposition, FIG. 8c illustrates each of components $LL_1$, $LH_1$, $HL_1$, $HH_1$.

Figure 8D:
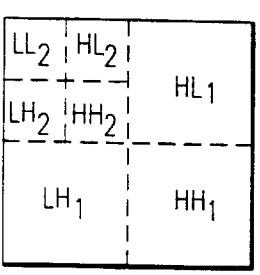

Components $LH_1$, $HL_1$, $HH_1$ are typically stored in memory at this point, as illustrated by process 68 in FIG. 6. Component $LL_1$ may also be stored at this point, and intraframe decomposition process 24 stopped for this frame, if an approximate compression ratio of 4:1 is sufficient. If additional compression is desired, as is typical, component $LL_1$ is again decomposed beginning again with process 56, in similar manner as the original input image $C_i$, resulting in four second-level decomposition components $LL_2$, $LH_2$, $HL_2$, $HH_2$ as shown in FIG. 8*d*. Each of components $LH_2$, $HL_2$, $HH_2$ are stored in memory. Again, the process may again be repeated upon component $LL_2$ for further compression, if desired.

Referring back to FIG. 4*a*, upon completion of intraframe decomposition process 24, decision 25 is performed in order to determine if additional image frames $C_i$ remain to be decomposed. If so, process 26 advances to the next frame, and intraframe decomposition process 24 is performed upon that next frame. Upon completion of the intraframe decomposition for all of the frames in the sequence, control passes next to interframe decomposition process 28.

Interframe decomposition process 28 performs a transform upon a small group of decomposed frames, preferably a pair of frames, or a group of four frames. It is preferred that the two or four frames decomposed by process 28 be adjacent in time or in space, to take advantage of the relatively small changes among the decomposed frames, such that the bulk of the information will be conveyed by the low-frequency decomposed component therefrom, with much of the high-frequency information being sparse (and thus readily compressible).

Figure 10:
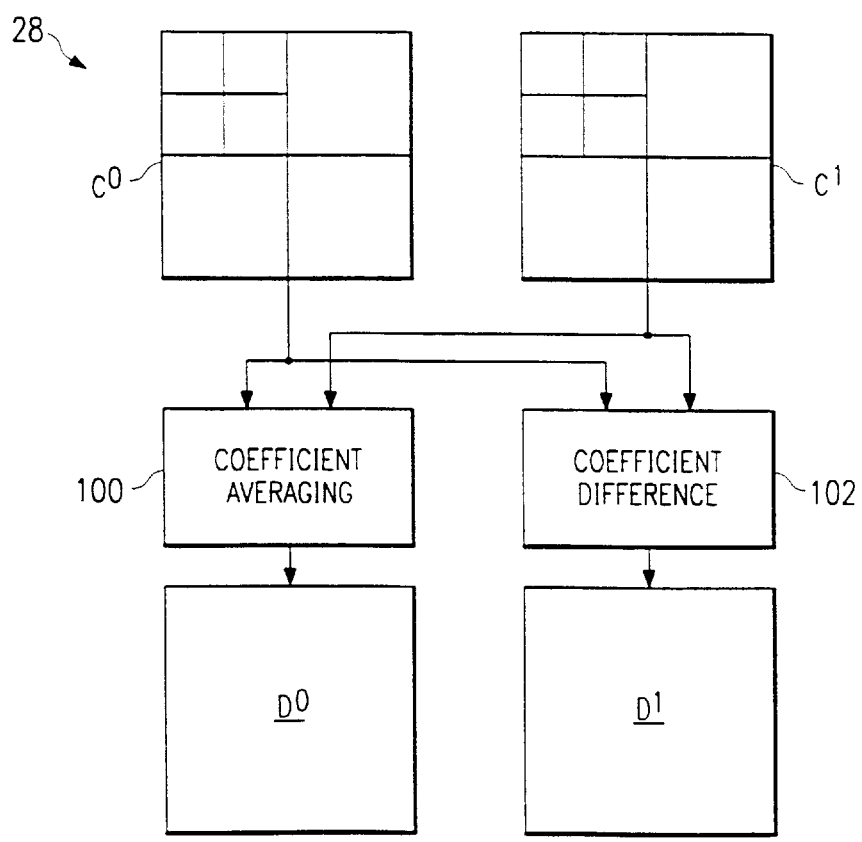
FIG. 10 is a flow chart illustrating an example of the interframe decomposition process performed according to the preferred embodiments of the invention.

Referring now to FIG. 10, an example of interframe decomposition process 28 according to the preferred embodiments of the invention will now be described for the example of interframe decomposition of two decomposed frames $C^0$, $C^1$. Frames $C^0$, $C^1$ at this stage include, at each array position $C_{i,j}$ therein (the index i indicating row position, and the index j indicating column position), a coefficient value corresponding to one of the low-frequency and high-frequency decomposition components generated in that frame from intraframe decomposition process 24. In this example of combining two frames, interframe decomposition process 28 includes coefficient averaging process 100, and coefficient difference process 102. Process 100 generates an average frame $D^0$ from frames $C^0$, $C^1$, having average coefficient $D^0_{i,j}$ at each array position generated as follows:

$$D^0_{i,j} = \frac{C^0_{i,j} + C^1_{i,j}}{2}$$

Similarly, process 102 generates a difference frame $D^1$ from frames $C^0$, $C^1$, having difference coefficient $D^1_{i,j}$ at each array position generated as follows:

$$D^1_{i,j} = \frac{C^0_{i,j} - C^1_{i,j}}{2}$$

The difference frame $D^1$ will typically include many coefficients $D^1_{i,j}$ that have zero or low magnitude, considering the temporal or spatial relationship between the adjacent frames $C^0$, $C^1$. In addition, considering that much of the input frames $C^0$, $C^1$ correspond to high frequency information, a great deal of the average frame $D^0$ will also have zero or low magnitude. These attributes of frames $D^0$, $D^1$ will result in significant compression upon the application of conventional quantization techniques, as will be described in further detail hereinbelow.

As will also be described in further detail hereinbelow, the averaging and transform processes 100, 102 are fully reversible. According to this embodiment of the invention, frames $C^0$, $C^1$ may be recovered as follows:

$$C_{i,j}^0 = D_{i,j}^0 + D_{i,j}^1$$

and:

$$C_{i,j}^1 = D_{i,j}^0 - D_{i,j}^1$$

As noted above, a group of four adjacent decomposed frames $C^0$, $C^1$, $C^2$, $C^3$ may also be combined in interframe decomposition process 28, by way of a matrix operation. This matrix operation is performed multiplying a matrix $C_{i,j}$, consisting of an array element $C_{i,j}$, from each of the four adjacent decomposed frames $C^0$, $C^1$, $C^2$, $C^3$, by an orthogonal coefficient matrix T to derive a matrix $D_{i,j}$, also having four elements $D_{i,j}$ for each of four transform frames $D^0$, $D^1$, $D^2$, $D^3$. The matrix operation of interframe decomposition process 28 for one example of the four-frame case is as follows:

$$\begin{bmatrix} D^0_{i,j} \\ D^1_{i,j} \\ D^2_{i,j} \\ D^3_{i,j} \end{bmatrix} = \begin{bmatrix} 1/4 & 1/4 & 1/4 & 1/4 \\ -3/a & -1/a & 1/a & 3/a \\ 1/4 & -1/4 & -1/4 & 1/4 \\ 1/a & -3/a & 3/a & -1/a \end{bmatrix} \begin{bmatrix} C^0_{i,j} \\ C^1_{i,j} \\ C^2_{i,j} \\ C^3_{i,j} \end{bmatrix}$$

As will be noted hereinbelow, a is a constant that corresponds to a constant b used in the interframe reconstruction process, where ab=20. The corresponding inverse matrix operation $C=T^{-1}D$, used in interframe reconstruction, is as follows:

$$\begin{bmatrix} C^0_{i,j} \\ C^1_{i,j} \\ C^2_{i,j} \\ C^3_{i,j} \end{bmatrix} = \begin{bmatrix} 1 & -3/b & 1 & 1/b \\ 1 & -1/b & -1 & -3/b \\ 1 & 1/b & -1 & 3/b \\ 1 & 3/b & 1 & -1/b \end{bmatrix} \begin{bmatrix} D^0_{i,j} \\ D^1_{i,j} \\ D^2_{i,j} \\ D^3_{i,j} \end{bmatrix}$$

Other orthogonal matrices may be used for interframe decomposition process 28 when applied to four frames. For example, for the case where ab=10, the following matrices T, $T^{-1}$ may be used for decomposition and reconstruction, respectively.

$$T = \begin{bmatrix} 1/4 & 1/4 & 1/4 & 1/4 \\ -2/a & -1/a & 1/a & 2/a \\ 1/4 & -1/4 & -1/4 & 1/4 \\ 1/a & -2/a & 2/a & -1/a \end{bmatrix}$$

$$T^{-1} = \begin{bmatrix} 1 & -2/b & 1 & 1/b \\ 1 & -1/b & -1 & -2/b \\ 1 & 1/b & -1 & 2/b \\ 1 & 2/b & 1 & -1/b \end{bmatrix}$$

Of course, other orthogonal matrix pairs may be derived to generate the interframe decomposition for two, four, or more decomposed frames, as may be readily derived by those of ordinary skill in the art.

Interframe decomposition process 28 is repeated for each group of frames in the sequence, until the entire sequence is complete. Referring back to FIG. 4a, the compressed transformed frames D are forwarded to quantization and encoding process 30. Process 30 quantizes each of the coefficients in compressed transformed frames D according to preselected criteria or techniques. Known quantization techniques in the art include simple thresholding (i.e., zeroing all coefficients having a magnitude below a specified threshold), simple scalar quantization (which amounts to rounding off each coefficient to a selected accuracy), JPEG quantization, vector quantization, and the like. Quantization of the compressed transformed frames D provides additional compression, especially when coupled with lossless compression as will be described hereinbelow. Alternatively to performing quantization after compression and transformation, quantization may be incorporated earlier into the process, for example within intraframe decomposition process 28.

According to the preferred embodiments of the invention, the quantization of process 30 is performed by assigning a quantizer $\rho$ for each component, or subband, of each transformed decomposed frame D in each set. The selection of the quantizers $\rho$ is made according to a preselected weighting as desired for each subband; typically, the higher frequency components are weighted relatively less than are the low frequency, or blur, components.

Figures 11A, 11B, 12A, 12B, 12C, 12D, 13:
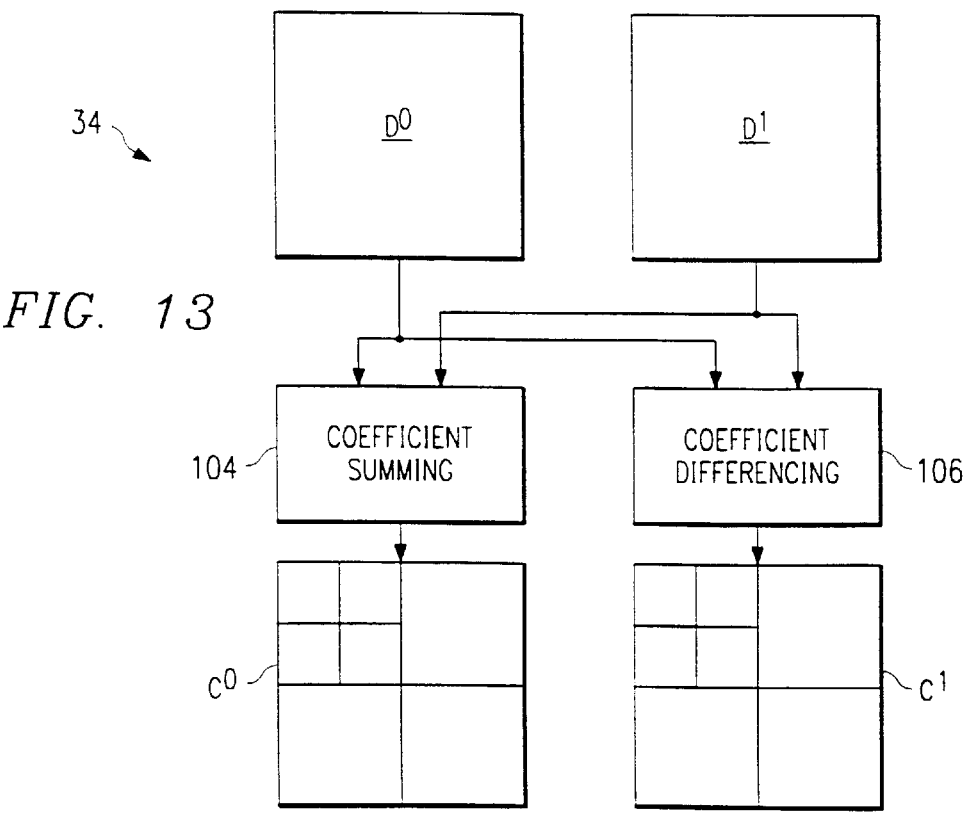
FIGS. 11*a* and 11*b* are illustrations of paired compressed images indicating the assignment of quantizer values according to the preferred embodiments of the invention.
FIGS. 12a through 12d are illustrations of a group of four compressed images indicating the assignment of quantizer values according to the preferred embodiments of the invention.
FIG. 13 is a flow chart illustrating an example of the interframe reconstruction process performed according to the preferred embodiments of the invention.

FIGS. 11a and 11b illustrate the assignment of quantizers $\rho$ for the case of two frame interframe decomposition process 28 described hereinabove, where each frame has been decomposed to two levels. Of course, the number of quantizers $\rho$ will depend upon the number of levels to which each frame has been decomposed in intraframe decomposition process 24. As noted above, each pair of frames $C^0$, $C^1$ are transformed into a pair of transform frames including a sum frame $D^0$ and a difference frame $D^1$. FIG. 11a illustrates the assignment of quantizers $\rho_0$ through $\rho_6$ for the subbands within sum frame $D^0$, and FIG. 11b illustrates the assignment of quantizers $\rho_7$ through $\rho_{11}$ for the subbands within difference frame $D^1$. The quantization process in process 30 consists of dividing each coefficient in each of frames $D^0$, $D^1$ by the quantizer $\rho$ assigned to the subband within which the coefficient resides. This division serves both to weight the particular subbands with a weighting factor, and also to reduce the number of bits required to represent each coefficient value.

FIGS. 12a through 12d illustrate the assignment of quantizers $\rho_0$ through $\rho_{27}$ for the subbands contained within transform frames $D^0$, $D^1$, $D^2$, $D^3$, where intraframe decomposition process 24 was performed to two levels, as described above. Again, each quantizer $\rho$ is selected according to the desired weighting for that particular subband. In process 30 in this case, each coefficient in each of transform frames $D^0$, $D^1$, $D^2$, $D^3$ is divided by its respective quantizer $\rho$.

Following quantization, lossless compression may be applied to the quantized transformed compressed frames D, also as part of process 30. The lossless compression utilized in process 30 may be according to any of the known conventional techniques, including Huffman encoding, adaptive Huffman encoding, arithmetic encoding, LSQ coding, and the like. Upon completion of lossless compression, process 30 completes with the encoding of the compressed frame sequence into a bit stream suitable for transmission, archival storage, or other desired application of the compressed data. The bit stream preferably contains information regarding the identity and sequence of frames D therein, the type of quantization and type of lossless compression applied in process 30, the type of transforms performed in interframe decomposition process 28 (i.e., two or four frame combinations and identification of the matrix T used) and the like, especially where the decompression systems may be called upon to operate upon compressed image sequences according to varying processes. The operation of compression system CS is now complete according to this embodiment of the invention.

Referring still to FIG. 4a, the decompression of a sequence of image frames according to this first embodiment of the invention will now be described in detail.

Decompression process begins with process 32 in which the encoded transmitted or archival bit stream is received by decompression system DS. The bit stream is first decoded from its bit stream form. Lossless decompression is then applied to reconstruct compressed transformed frames T, by performing the inverse of the lossless compression process performed in process 30.

Process 32 also performs dequantization, or normalization, of the coefficient values to the extent required by the quantization process performed by compression system CS. For the preferred embodiments of the invention described hereinabove in which quantization was effected by dividing each coefficient by a quantizer $\rho$ assigned to its subband, the dequantization of process 32 will be performed by multiplying each coefficient by the same quantizer $\rho$ for its subband. The combination of the decoding, lossless decompression, and dequantization of process 32 thus operates to reconstruct decompressed transformed frames D by reversing process 30 applied in compression.

Interframe reconstruction process 34 is next performed by decompression system DS to transform frames D into the uncombined individual frames C. As described hereinabove relative to process 28, each of the interframe decomposition techniques are fully reversible. Referring to FIG. 13, interframe reconstruction process 34 for the case of the two-frame decomposition of FIG. 10 will now be described. In this example, interframe reconstruction process 34 includes coefficient summing process 104, and coefficient differencing process 106. Process 104 recovers frame $C^0$ from average frame $D^0$ and difference frame $D^1$ by generating the coefficient $C^0_{i,j}$ at each array position as follows:

$$C_{i,j}^0 = D_{i,j}^0 + D_{i,j}^1$$

Similarly, differencing process 106 generates frame $C^1$ from frames $D^0$, $D^1$, by recovering coefficients $C^1_{i,j}$ at each array position as follows:

$$C_{i,j}^1 = D_{i,j}^0 - D_{i,j}^1$$

In the case where four frames C were combined in each group of interframe decomposition process 28 by way of the matrix operations described hereinabove, interframe reconstruction process 34 will be performed by applying the inverse matrix $T^{-1}$ defined hereinabove to each matrix of four coefficient entries from frames D as follows:

$$\begin{bmatrix} C_{i,j}^0 \\ C_{i,j}^1 \\ C_{i,j}^2 \\ C_{i,j}^3 \end{bmatrix} = T^{-1} \begin{bmatrix} D_{i,j}^0 \\ D_{i,j}^1 \\ D_{i,j}^2 \\ D_{i,j}^3 \end{bmatrix}$$

where the matrix $T^{-1}$ corresponds to the matrix defined hereinabove, and depends upon the combination of constants a, b used in interframe decomposition process 28.

In any case, interframe reconstruction process 34 is performed upon each group of frames in the received image sequence. Interframe reconstruction process 34, when complete, thus reconstructs each of individual frames C in decomposed form, ready for processing by intraframe reconstruction process 36, as will now be described.

Figure 14:
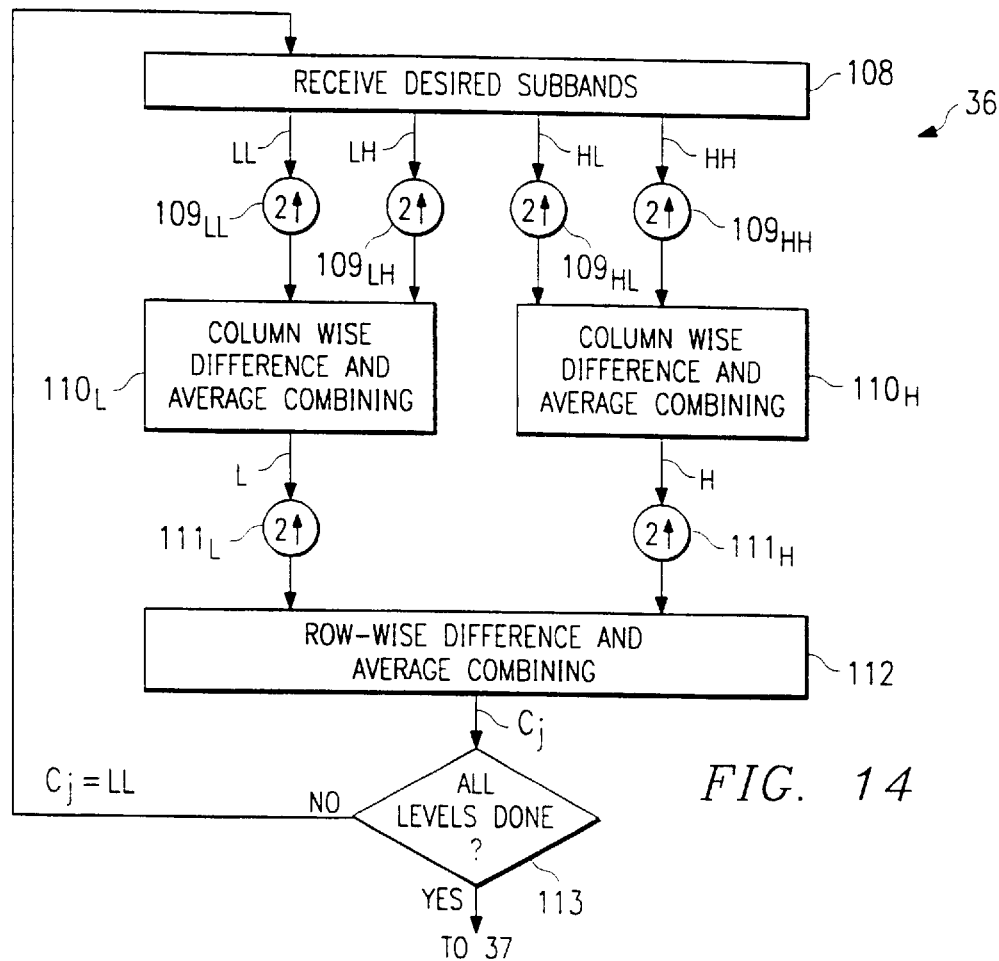
Figure 15:
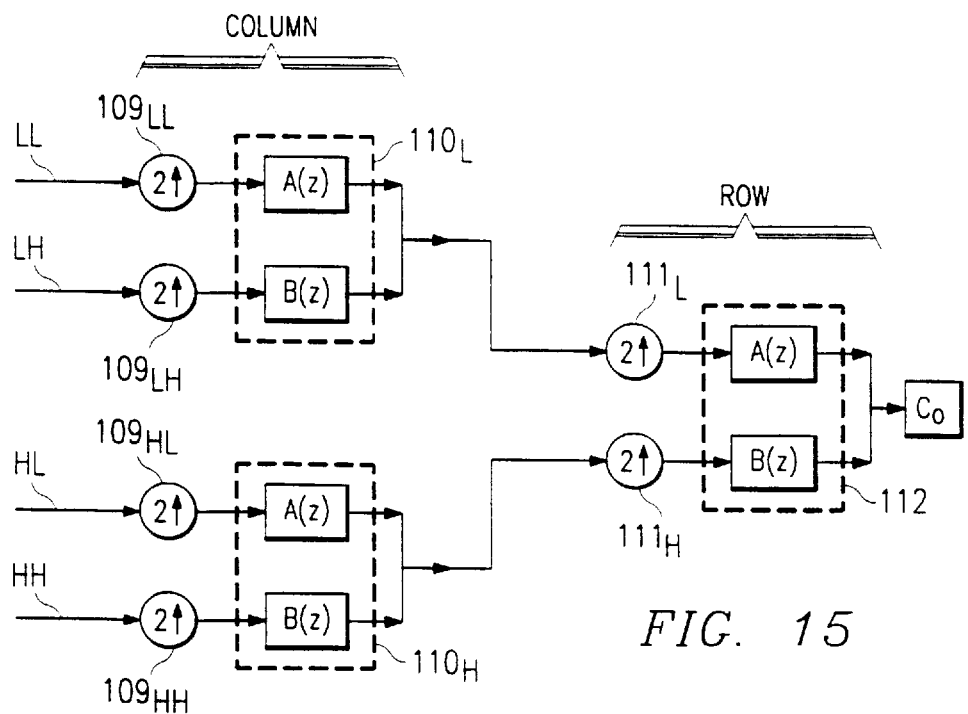
FIG. 15 is a functional block diagram illustrating the filter scheme for intraframe reconstruction according to the method illustrated relative to FIG. 6.

In this first embodiment of the invention as described hereinabove relative to intraframe decomposition process 24, Cholesky decomposition filtering, performed by way of backward and forward differencing, was included in the decomposition of the individual image frames. According to this embodiment of the invention, therefore, there is no need for decompression system DS to perform Cholesky filtering in any way. Instead, referring back to FIG. 3a, only the application of filter functions A(z), B(z) are required in order to reconstruct each frame of image data. Referring now to FIGS. 14 through 16, the method of performing intraframe reconstruction process 36 according to this first embodiment of the invention will now be described.

FIG. 14 is a flow chart illustrating the operation of intraframe reconstitution process 36 according to this embodiment of the invention, in a manner corresponding to the filter scheme of FIG. 15. FIGS. 16a through 16e illustrate the arrangement of subbands, or components, for a two-level decomposed frame as will now be reconstructed in this example. As shown in process 14, intraframe reconstruction process 36 begins with process 108, in which the subbands to be used in the first pass of intraframe reconstruction process 36 are received. Referring to the example of FIGS. 16a through 16e, the subbands $LL_2$, $LH_2$, $HL_2$, $HH_2$ are retrieved from memory in process 108 in this first pass of intraframe reconstruction process 36 for this frame, as this pass will reconstruct component $LL_1$ from these frames. Components $LH_2$, $HL_2$, $HH_2$, which were transmitted and derived in the interframe reconstruction process 34, are not retrieved as of yet.

Each of the subbands $LL_2$, $LH_2$, $HL_2$, $HH_2$ are upsampled by a factor of two in the column direction by way of processes 109, in order to derive a full sequence of coefficients in each column. The upsampling of processes 109 is performed merely by inserting zero values between alternating coefficients in the sequences retrieved in process 108.

The coefficient sequences for subbands, or components, $LL_2$, $LH_2$, $HL_2$, $HH_2$ are then applied to column-wise difference and average combining processes 110. As illustrated in FIGS. 14 and 15, components $LL_2$, $LH_2$, are combined by process $110_L$, while components $HL_2$, $HH_2$ are combined by process $110_H$. Processes 110 each apply filter functions A(z), B(z) to the low and high frequency component sequences presented thereto, and sum the results into a combined sequence, in effect performing the inverse of the column and difference averaging processes 62 used in intraframe decomposition process 24 by way of which the compressed frames were generated. The particular filter functions A(z), B(z) will, of course, have the same order m as filter functions P(z), Q(z), K(z) applied in compression. For m odd, one may express the filter functions A(z), B(z) in general as follows:

$$A(z) = z^{-1} P(z)$$

$$B(z) = -z^{-1} -P(-z)$$

For m even:

$$A(z) = P(z)$$

$$B(z) = z^2 Q(z) = zP(-z)$$

As in the compression process, the filter functions A(z), B(z) may be implemented by way of relatively simple digital filters, either in software or in dedicated hardware, and utilizing only integer processes. Since the Cholesky decomposition filtering was performed in the compression process, it need not be performed in decompression, and as such the computing requirements for decompression system DS may be quite modest.

Figure 17A:
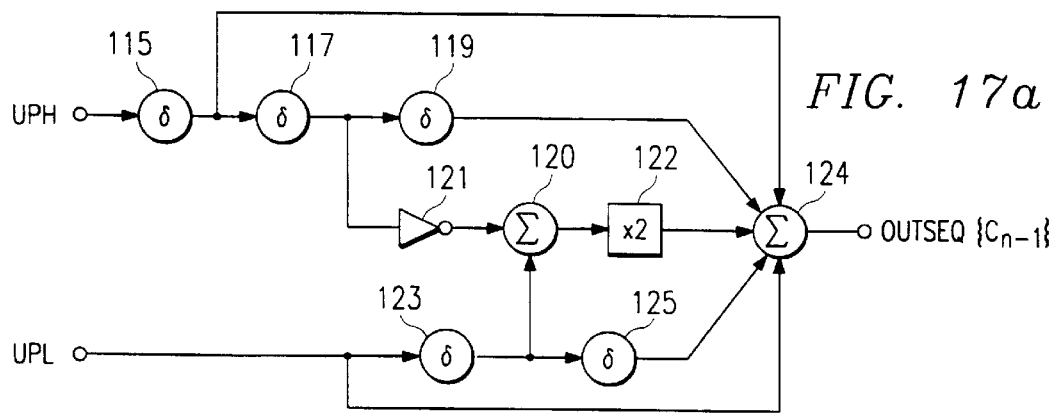
FIGS. 17a through 17c are electrical diagrams, in schematic form, functionally illustrating circuitry or computer operations for performing average and difference filtering as used in intraframe reconstruction according to the preferred embodiments of the invention, for various orders of filtering.

Referring to FIG. 17a, a functional flow for process 110 (and process 112) for m=2 is illustrated, and will now be described. The input high-frequency coefficient sequence (in the case of process $110_L$, component LH; in the case of process $110_H$, component HH) is received on line UPH, and applied to a series of delay stages 115, 117, 119. The output of delay stage 115 is forwarded to summation node 124. The output of delay stage 117 is applied, after sign change by inverter 121, to summation node 120. The output of delay stage 119 is also applied to summation node 124. The input low-frequency coefficient sequence (component LL in the case of process $110_L$; component HL in the case of process $110_H$) on line UPL is applied to summation node 124, and to delay stage 123. The output of delay stage 123 is applied to summation node 120, and to delay stage 125, the output of which is also applied to summation node 124. The output of summation node 120 is shifted left by one bit by multiplier 122, and applied to summation node 124. The output of summation node 124, on line OUTSEQ, corresponds to an output sequence $\{c_{n-1}\}$, generated from input sequences $\{c_n\}$ (on line UPL) and $\{d_n\}$ (on line UPH), and thus corresponds to the next level of reconstruction.

Figure 17B:
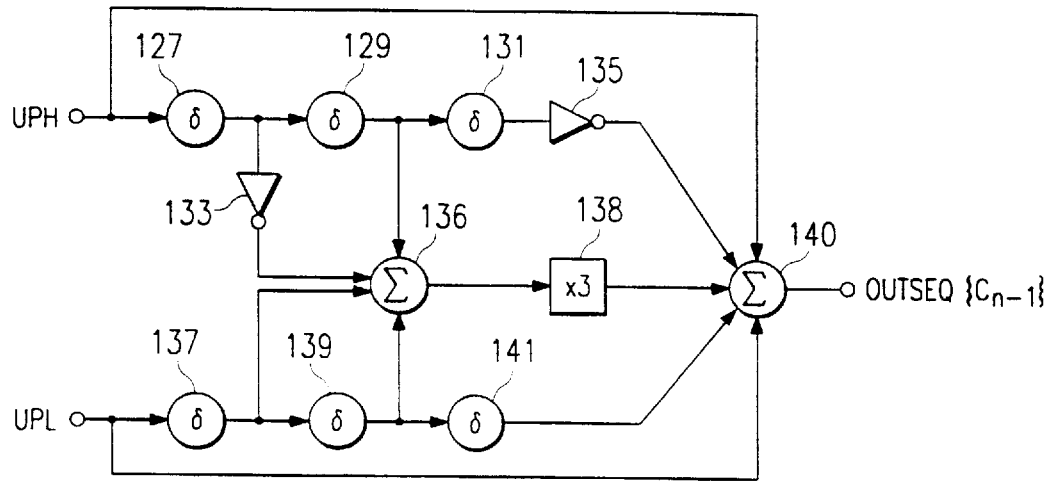

FIG. 17b illustrates the functional implementation for reconstruction processes 110, 112, for the case of m=3. In FIG. 17b, line UPH is applied to a series of delay stages 127, 129, 131. The output of delay stage 127 has its sign changed by inverter 133, and is then applied to summation node 136; the output of delay stage 129 is also applied to summation node 136. The output of delay stage 131, after a sign change by inverter 135, is applied to summation node 140, as line UPH itself directly is applied. Line UPL is applied to a series of delay stages 137, 139, 141, and directly to summation node 140. The outputs of delay stages 137 and 139 are applied to summation node 136, and the output of delay stage 141 is applied to summation node 140. The output of summation node 136 is multiplied by three via multiplier 138, and applied to summation node 140. Summation node 140 thus generates coefficient sequence $\{c_{n-1}\}$ for the case where m=3, again by combining two decomposition sequences $\{c_n\}$, $\{d_n\}$ in a relatively simple manner, requiring only integer operations in combination with the appropriate delays and sums.

Figure 17C:
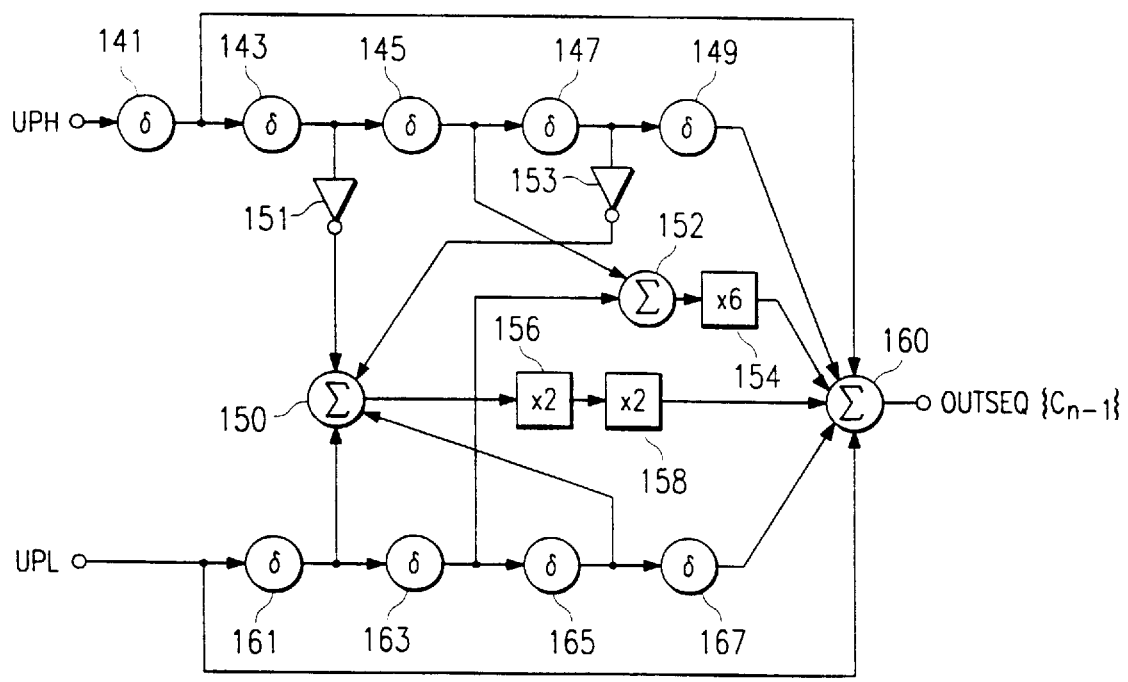

FIG. 17c illustrates the implementation of processes 110 (and process 112) according to the case where m=4. As illustrated therein, line UPH is received by a series of delay stages 141, 143, 145, 147, 149. The outputs of delay stages 143, 147 are inverted in sign by inverters 151, 153, respectively, and applied to summation node 150, the outputs of delay stages 141, 149 are applied directly to summation node 160, and the output of delay stage 145 is applied to summation node 152. Line UPL is applied to summation node 160, and is received by a series of delay stages 161, 163, 165, 167. The outputs of delay stages 161, 165 are applied to summation node 150, the output of delay stage 163 is applied to summation node 152, and the output of delay stage 167 is applied to summation node 160. The output of summation node 150 is multiplied by four, by way of one-bit left-shift units 156, 158, and applied to summation node 160, while the output of summation node 153 is multiplied by six by multiplier 154, and applied to summation node 160. The output of summation node 160 presents, on line 160, coefficient sequence $\{c_{n-1}\}$ for the case where m=4, again by combining two decomposition sequences $\{c_n\}$, $\{d_n\}$ in a relatively simple manner, requiring only integer operations.

It is contemplated that the functional implementation of difference and average combining for other orders m of filter operators A(z), B(z) will be apparent to those of ordinary skill in the art having reference to this description.

Figures 16A, 16B, 16C, 16D, 16E:
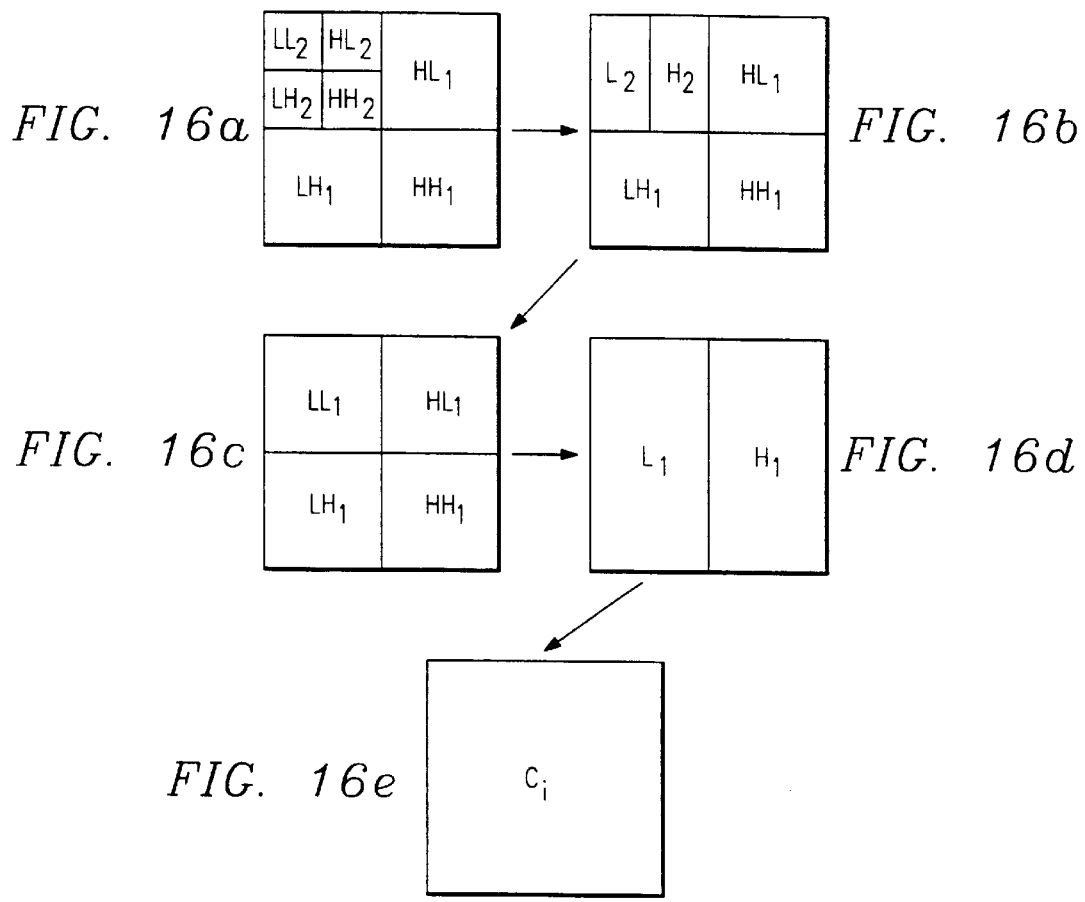
FIGS. 16a through 16e are illustrations of an image at various stages of the intraframe reconstruction method of FIG. 6.

Following the performance of process $110_L$, component $L_2$ is generated in this first pass through process 36; similarly, process $110_H$ generates component $H_2$. FIG. 16b illustrates the composition of frame $C_i$ at this stage, following the column-wise reconstruction of components $L_2$, $H_2$. The combining process is then repeated in the row-wise direction, with upsample processes $111_L$, $111_H$ followed by row-wise difference and average combining process 112. Process 112 follows the same functional implementation as process 110 described hereinabove, using the implementation of the one of FIGS. 17a through 17c for the order m of the decomposition. Indeed, where the implementation of FIGS. 17a through 17c is made by way of custom hardware, the very same circuitry may be used to perform each of processes $100_L$, $110_H$, 112.

Following the combining of process 112, referring to FIG. 16c, component $LL_1$ is returned in this first pass of reconstruction process 36. At this point in the process, decision 113 is performed by decompression system DS to determine if additional levels of reconstruction are required for the frame $C_i$ at this point. For the case where the condition of frame $C_i$ is as shown in FIG. 16c, an additional level of reconstruction is in fact required, as the sequence generated by process 112 corresponds to subband, or component, $LL_1$. Decision 113 thus returns a NO, and control passes back to process 108 to repeat a pass of process 36. In this case, component subbands $HL_1$, $LH_1$, $HH_1$ for the current frame are retrieved from memory, and combined with component $LL_1$ generated in the previous pass through process 36 to reconstruct the image. In this second pass, processes 110 generate components $L_1$, $H_1$ as illustrated in FIG. 16d, and process 112 generates the final reconstructed image $C_i$ as shown in FIG. 16e.

Of course, the number of passes through process 36 for each image frame $C_i$ will depend upon the level of its decomposition during compression. While the above description was provided for the case of two levels of decomposition, it is of course contemplated that fewer or more levels of decomposition may be performed, depending upon the desired compression ratio.

Referring back to FIG. 4a, following process 36, decision 37 is performed by decompression system DS to determine if additional frames require intraframe reconstruction process 36. If so, decompression system DS advances to the next frame (process 38), and performs intraframe reconstruction process 36 on that frame, to reconstruct the image according to the number of levels of decomposition required.

Upon completion of intraframe reconstruction process 36 for all of the frames in the sequence (i.e., decision 37 returns a NO), the sequence of images is ready for display or storage in its decompressed form, as desired by the user. In this first embodiment of the invention, where the Cholesky decomposition filtering was applied during compression, and was not applied during decompression, it is contemplated that the display of the sequence of images performed in process 40 may occur in a real time manner with the receipt of images in process 32. This real-time display indicates that the decompression of each frame may be performed in a manner suitable for the display of compressed video-on-demand, with the motion picture being of a very high resolution, and sufficient compression ratio as to be communicated over conventional telecommunication facilities.

As discussed hereinabove relative to FIGS. 3a and 3b, the present invention is particularly beneficial in that it permits application of the Cholesky decomposition filtering process to be performed in either the compression system or in the decompression system, depending upon the system application and the location of the greater amount of computing resources. Referring again to FIG. 4b, a second preferred embodiment of the invention will now be described, in which the Cholesky filtering process is merged within the decompression system, thus greatly simplifying the computing burden placed upon the compression system.

Figure 18:
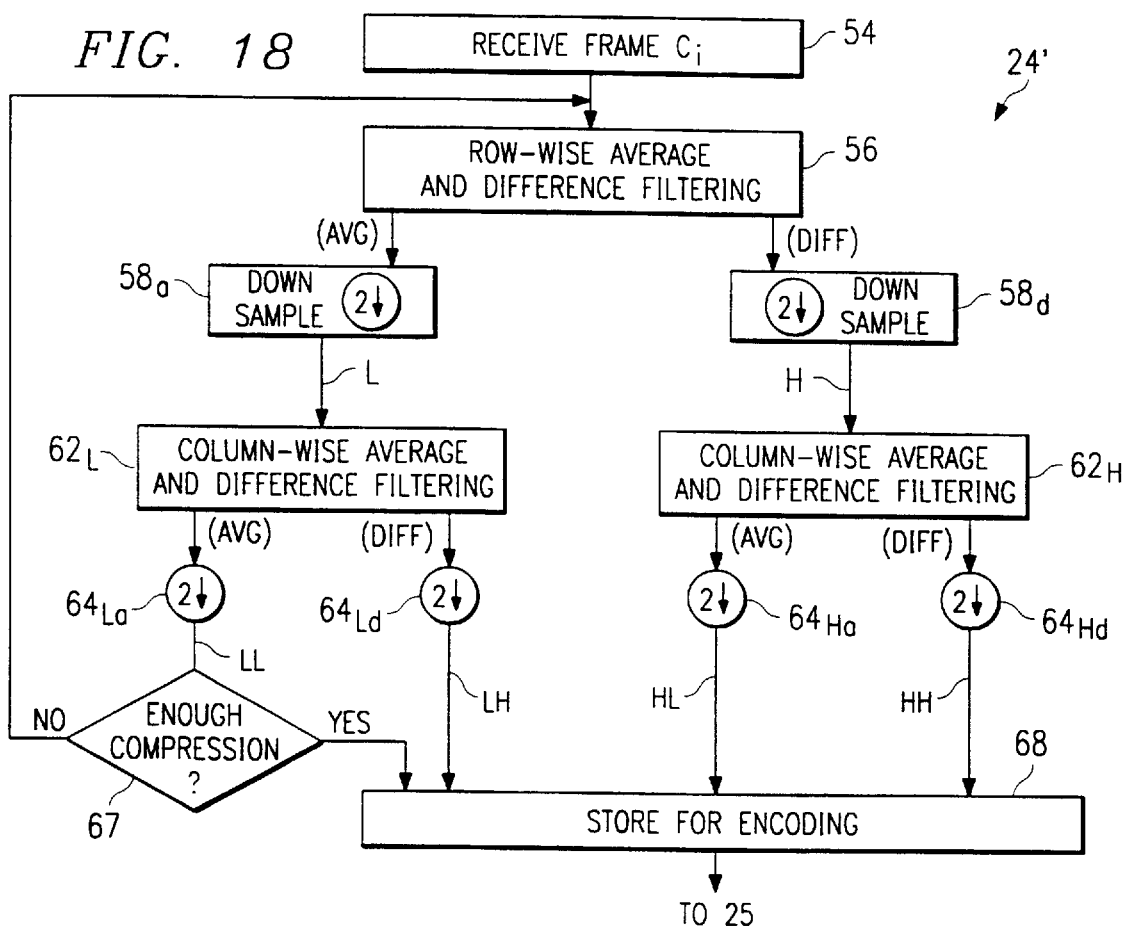
FIG. 18 is a flow chart illustrating the method of intraframe decomposition according to the method illustrated relative to FIG. 3b.
Figure 19:
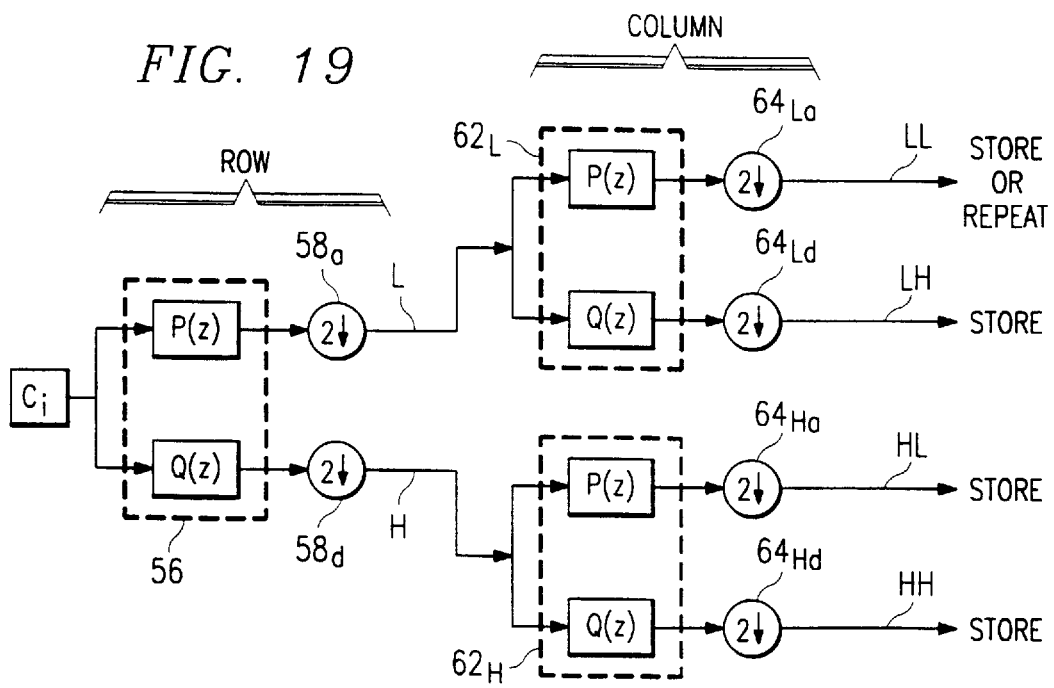
FIG. 19 is a functional block diagram illustrating the filter scheme for intraframe decomposition according to the method illustrated relative to FIG. 18.

In FIG. 4b, compression begins also with digitizing process 22, as described hereinabove relative to FIG. 4a. Intraframe decomposition process 24' is next performed on the individual image frames $C_i$ prepared by digitizing process 22. As indicated in FIG. 4b, intraframe decomposition process 24' is performed without incorporating thereinto the Cholesky decomposition filtering process, similarly as in the filter scheme illustrated in FIG. 3b. Referring now to FIGS. 18 and 19 in combination, intraframe decomposition process 24' according to this embodiment of the invention will now be described in detail.

As will be evident from FIG. 18, many of the processes are identical with those of process 24, and as such will be identified by the same reference numerals. Intraframe decomposition process 24' begins with receipt of an individual frame $C_i$ in process 54, followed by row-wise average and difference filtering process 56. Row-wise average and difference filtering process 56 applies the filter functions P(z), Q(z), of order m, to frame $C_i$ to generate average and difference sequences AVG, DIFF, respectively, for each row of the image. The functional construction of circuitry or computer programs to perform average and difference filtering process 56 (and processes 62) will, as before, depend upon the order m of the filtering, and is preferably configured as described hereinabove relative to FIG. 9a, 9b, or 9c. Average and difference sequences are downsampled by a factor of two in processes 58a, 58d, respectively, and applied to column-wise average and difference filtering processes 62L, 62H, respectively. Column-wise average and difference filtering processes 62L, 62H each produce average and difference output sequences AVG, DIFF, respectively, as before, which are again downsampled by a factor of two in processes 64.

The downsampled output from processes 64 correspond to the LL, LH, HL, HH decomposition components, or subbands, of image $C_i$. As in the first embodiment of the invention, decision 67 is performed to determine whether additional compression is desired, in which case the LL component is reprocessed beginning with row-wise average and differencing process 56 to obtain the next level of decomposition, and the LH, HL, HH components are stored for encoding. At such time as the desired compression has been obtained (i.e., decision 67 is YES), the LL component is also stored and control passes to decision 25. The output of intraframe decomposition process 24' according to this embodiment of the invention is thus similar to that generated by process 24 in FIG. 4a, except that Cholesky decomposition filtering has not yet been applied. The absence of the Cholesky filtering is apparent also from the filter scheme of FIG. 19 for the process of FIG. 18 according to this embodiment of the invention.

Referring back to FIG. 4b, decision 25 and process 26 ensure that each of the frames in the sequence of images is similarly decomposed by intraframe decomposition process 24'. Once all frames have been processed (i.e., decision 25 is NO), interframe decomposition process 28 is performed on adjacent groups of decomposed frames, in the identical manner as that described hereinabove relative to the first embodiment of the invention illustrated in FIG. 4a. Quantization, lossless compression, and encoding is then performed in process 30, as described hereinabove, and the operation by compression system CS is then complete with the transmission or storage of the compressed image sequence.

The elimination of Cholesky decomposition filtering from the compression process according to this embodiment of the invention enables the compression system CS to have only modest computing capability, and also enables the real-time capture and compression of images in a sequence. As such, this embodiment of the invention is particularly well-suited for implementation in applications such as that illustrated in FIG. 5b, where the computing capability may be concentrated in the decompression system DS, as will now be described relative to FIG. 4b.

As shown in FIG. 4b, the decompression process begins with process 32, in which the incoming bit stream representative of the image sequence is received by decompression system DS, and is dequantized, decoded, and subjected to lossless decompression, in the inverse manner appropriate based upon the corresponding operations of process 30. Interframe reconstruction process 34 is then performed, in the manner described hereinabove relative to process 34 of FIG. 4a, to yield individual compressed frames C from the transformed compressed frames D generated in interframe decomposition process 28. Each frame is then applied to intraframe reconstruction process 36' which, according to this embodiment of the invention, includes the application of the Cholesky filtering (i.e., application of the filter function 1/K(z) described above), as will now be described in detail relative to FIGS. 20 and 21.

Figure 20:
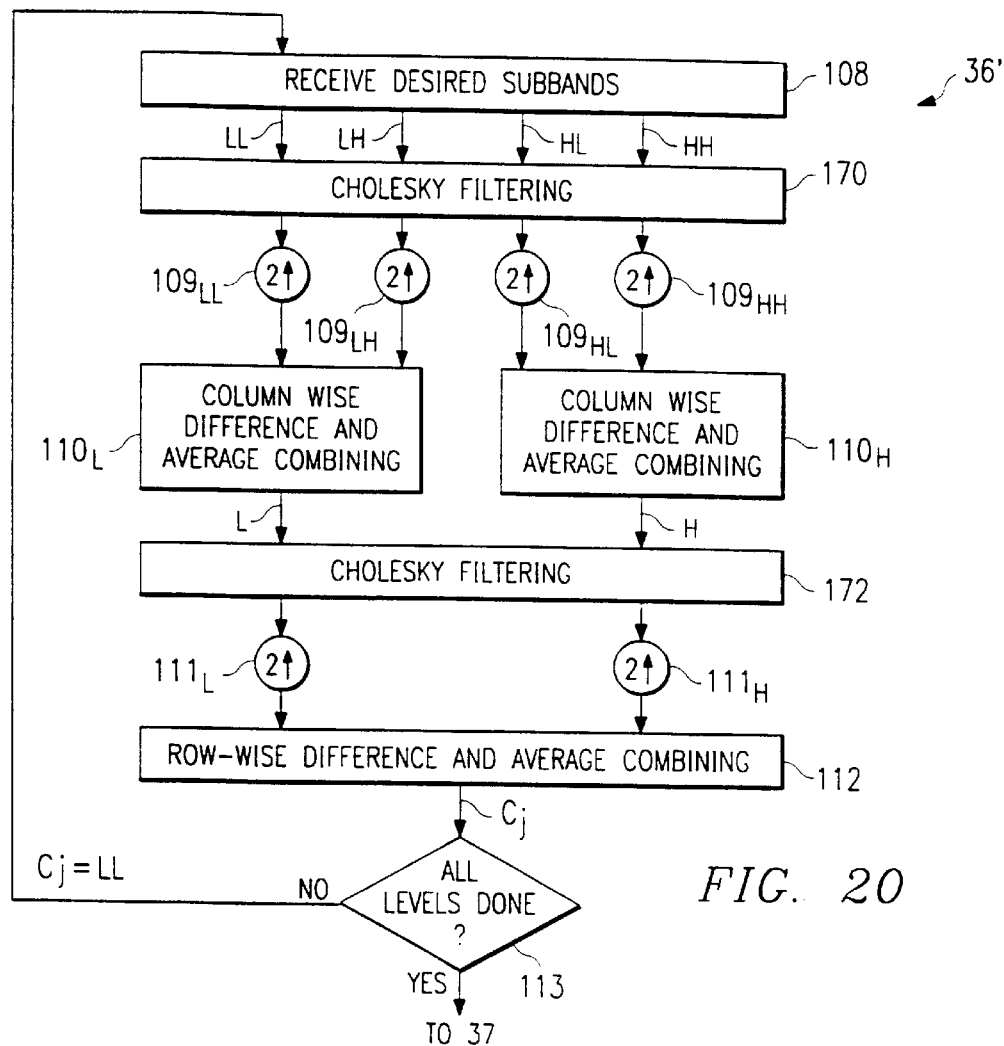
FIG. 20 is a flow chart illustrating the method of intraframe reconstruction according to the method illustrated relative to FIG. 3b.

As shown in the flow of FIG. 20, intraframe reconstruction process 36' begins with process 108, in which the desired subband components of the image frame $C_i$ to be reconstructed are received from memory, again depending upon the level of decomposition active at this time. These subband components include the LL, LH, HL, HH components for the level of decomposition.

Upon receipt of the appropriate components LL, LH, HL, HH, Cholesky filtering process 170 is applied to each component coefficient sequence individually. As described hereinabove relative to FIG. 6, Cholesky filtering is preferably performed through the use of forward and backward differencing techniques, using the appropriate recursive formulae indicated by the particular order m of filtering. Alternatively, Cholesky filtering process 170 may be performed by way of matrix operations, although the forward and backward differencing method is believed to be more efficient. Following Cholesky filtering process 170, each of the filtered sequences are upsampled by a factor of two in processes 109, by inserting zero coefficients between each adjacent coefficients in the sequences.

As noted hereinabove, the order of Cholesky filtering process 170 and upsampling processes 109 may be reversed, in which case the Cholesky filtering process would apply the polynomial filter $1/K(z^2)$.

Figure 21:
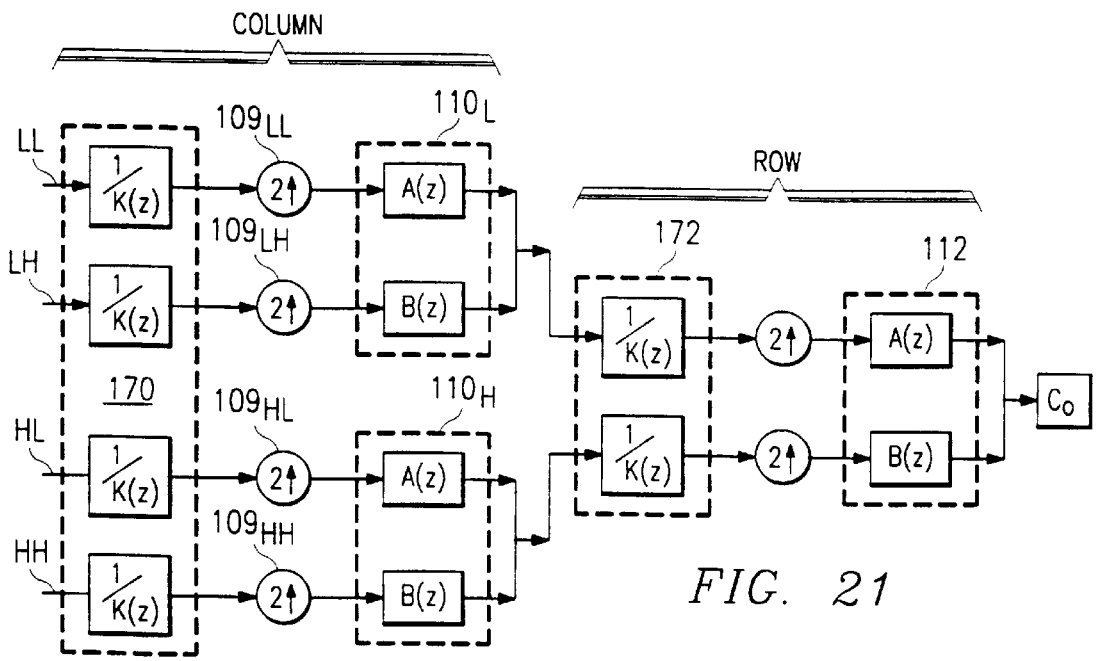
FIG. 21 is a functional block diagram illustrating the filter scheme for intraframe reconstruction according to the method illustrated relative to FIG. 20.

Referring back to FIG. 20, column-wise difference and average combining processes $110_L$, $110_H$ are applied to the upsampled sequences corresponding to the Cholesky filtered sequences LL, LH, HL, HH. As in the previous embodiment of the invention described hereinabove relative to FIG. 4a, processes 110 may be performed by way of circuitry or computer programs implemented according to the functional implementations of FIGS. 17a through 17c, depending upon the order m of the compression. The outputs of processes $110_L$, $110_H$ are the L and H components, respectively, for the particular level of reconstruction. As shown in FIGS. 20 and 21, Cholesky filtering process 172 is again applied to these component sequences L, H, in the same manner as described hereinabove relative to process 170, preferably by way of forward and backward differencing techniques.

Following Cholesky filtering process 172, the sequences L, H are upsampled by a factor of two in processes 111L, 111H, respectively, by the insertion of zeroes therein. Row-wise difference and average combining process 112 is then performed in the same manner as processes 110 described hereinabove, resulting in a sequence of coefficients $\{c_i\}$ corresponding to the reconstructed image $C_i$ for the particular level of reconstruction. If all levels of reconstruction are not yet complete, as indicated by decision 113, the sequence $\{c_i\}$ is applied back to process 108 as the LL component, along with the LH, HL, HH components for that level of decomposition, for an additional pass through process 36'.

Upon completion of intraframe reconstruction process 36' for a frame (i.e., decision 113 is YES), decision 37 (FIG. 4b) is then performed to determine if additional frames remain to be processed, in which case process 38 advances to the next frame and intraframe reconstruction process 36' is performed for that next frame. Upon completion of the entire sequence (decision 37 is No), the image sequence is ready for storage or display in process 40.

Again, as discussed above, decompression system DS undertakes the bulk of the computing burden according to this second embodiment of the invention, since the Cholesky filtering processes 170, 172 are merged into the decompression process. This frees compression system CS from this burden, allowing compression system CS to be implemented with relatively modest capability, reducing its cost.

According to the preferred embodiments of the invention, therefore, great flexibility in the implementation of the compression and decompression burden is provided. The ability to place the computational burden in either the compression or decompression system enables the use of sophisticated compression technology, providing high fidelity results and real-time compression or decompression, in situations where computing capability is not available on either the compression or decompression sides. It is therefore contemplated that the present invention will be very beneficial in providing compression in many current environments in which the effect of prior compression technologies has been limited.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of compressing and decompressing a sequence of images, comprising the steps of:

compressing the sequence of images into a compressed sequence, by performing the steps of:

digitizing each image in the sequence into an image frame comprising an array of intensity coefficients arranged in first and second directions;

performing an intraframe decomposition of each image frame by the steps of:

performing averaging and differencing of the image frame in a first direction to generate average and difference coefficient sequences;

downsampling the average and difference coefficient sequences;

performing averaging and differencing of the image frame in a second direction; and downsampling sequences from the step of performing averaging and differencing of the image frame in the second direction, to generate a decomposed image frame;

performing an interframe decomposition of groups of decomposed image frames to generate a compressed sequence of image frames;

decompressing the compressed sequence of images into a reconstructed sequence, by performing the steps of:

performing an interframe reconstruction of the groups of decomposed image frames; and then performing an intraframe reconstruction of each image frame by the steps of:

upsampling the average and difference coefficient sequences;

performing average and difference combining of the upsampled sequences in the second direction;

upsampling sequences resulting from the step of performing average and difference combining; and performing averaging and differencing of the image frame in the first direction, to generate a reconstructed image frame;

wherein one of the intraframe decomposition and intraframe reconstruction steps further comprises:

performing Cholesky filtering upon coefficient sequences corresponding to the image frame.

2. The method of claim 1, wherein the steps of performing averaging and differencing, of performing average and difference combining, and of performing Cholesky filtering, are performed according to an order m, where m is greater than one.

3. The method of claim 1, wherein the step of performing interframe decomposition comprises:

combining first and second decomposed image frames with one another to generate a frame pair comprising average frame and a difference frame; and repeating the combining step for each pair of decomposed image frames in the sequence;

and wherein the step of performing interframe reconstruction comprises:

operating upon the average frame and difference frame in each frame pair to recover first and second image frames therefrom.

4. The method of claim 1, wherein the step of performing interframe decomposition comprises:

combining a group of four decomposed image frames with one another to generate a group of four transform frames; and repeating the combining step for each group of four decomposed image frames in the sequence;

and wherein the step of performing interframe reconstruction comprises:

operating upon each group of four transform frames to recover a group of four image frames therefrom.

5. The method of claim 1, further comprising:

displaying a motion picture comprised of a sequence of reconstructed image frames.

6. The method of claim 1, wherein the step of performing an intraframe decomposition is performed a plurality of times upon each frame.

7. The method of claim 6, wherein the step of performing an intraframe reconstruction is performed, for each frame, the same number of times as the step of performing an intraframe decomposition.

8. The method of claim 1, wherein the step of performing an intraframe decomposition of each image frame further comprises:

performing Cholesky filtering upon the average and difference coefficient sequences; and performing Cholesky filtering upon the results of the step of performing averaging and differencing in a second direction.

9. The method of claim 8, wherein each of the Cholesky filtering steps comprises:

performing a backward differencing; and performing a forward differencing.

10. The method of claim 8, wherein the step of performing Cholesky filtering upon the average and difference coefficient sequences is performed after the first downsampling step;

and wherein the step of performing Cholesky filtering upon the results of the step of performing averaging and differencing in a second direction is performed after the second downsampling step.

11. The method of claim 1, wherein the step of performing an intraframe reconstruction of each image frame further comprises:

performing Cholesky filtering upon components of each image frame, before the step of performing average and difference combining in the second direction; and performing Cholesky filtering upon the results of the step of performing average and difference combining in the second direction, before the step of performing average and difference combining in the first direction.

12. The method of claim 11, wherein each of the Cholesky filtering steps comprises:

performing a backward differencing; and performing a forward differencing.

13. The method of claim 11, wherein the step of performing Cholesky filtering upon components of each image frame is performed before the first upsampling step;

and wherein the step of performing Cholesky filtering upon the results of the step of performing average and difference combining in the second direction is performed before the second upsampling step.

14. The method of claim 1, wherein the compressing step further comprises:

after the step of performing an interframe decomposition, quantizing each of the coefficients in the compressed sequence of image frames;

and wherein the decompressing step further comprises:

before the step of performing an interframe reconstruction, dequantizing the compressed sequence of images.

15. The method of claim 14, wherein the quantizing step comprises:

dividing each coefficient in the compressed sequence of image frames by a quantizer;

and wherein the dequantizing step comprises:

multiplying each coefficient in the compressed sequence of images by the quantizer.

16. The method of claim 15, wherein each image frame in the compressed sequence of image frames corresponds to a frequency component subband, such that each of the image frames corresponds contains a plurality of subbands;

and wherein the quantizer used in the quantizing and dequantizing steps varies among the plurality of subbands.

* * * * *